United States Patent

Yamamoto et al.

[11] Patent Number: 5,807,643
[45] Date of Patent: Sep. 15, 1998

[54] NICKEL-HYDROGEN SECONDARY BATTERY

[75] Inventors: Masaaki Yamamoto, Inzai; Hirotaka Hayashida, Fujisawa; Tomoyuki Ono, Kawasaki, all of Japan

[73] Assignees: Kabushiki Kaisha Toshiba, Kawasaki; Toshiba Battery Co., Ltd., Tokyo, both of Japan

[21] Appl. No.: 729,297

[22] Filed: Oct. 10, 1996

[30] Foreign Application Priority Data

Oct. 13, 1995 [JP] Japan ................................. 7-265859
Sep. 6, 1996 [KR] Rep. of Korea .................. 1996-38643

[51] Int. Cl.[6] .................................................... H01M 2/16
[52] U.S. Cl. ........................... 429/101; 429/250; 429/254
[58] Field of Search .................................... 429/250, 254, 429/101, 206

[56] References Cited

U.S. PATENT DOCUMENTS 5,204,197 4/1993 Takai et al. ........................ 429/250 X
5,354,617 10/1994 Ikkanzaka et al. ................. 429/250 X

FOREIGN PATENT DOCUMENTS 5-234577 9/1993 Japan .
6-140015 5/1994 Japan .
WO 93/01622 1/1993 WIPO .

Primary Examiner—Stephen Kalafut
Attorney, Agent, or Firm—Oblon, Spivak, McClelland, Maier & Neustadt, P.C.

[57] ABSTRACT

A nickel-hydrogen secondary battery comprising, a positive electrode containing nickel hydroxide, a negative electrode containing a hydrogen-absorbing alloy, a separator interposed between the positive electrode and the negative electrode and containing olefin-containing-polymer based fibers having an ion-exchange group, and an alkaline electrolyte having a normality of 5 or more in concentration, wherein the separator satisfies the following equation (1):

$$\{0.409-(X/55)\} \leq Y \leq \{0.636+(2X/55)\} \qquad (1)$$

where X is a chemical equivalent of alkaline electrolyte per 1 Ah of battery capacity (meq/Ah) and Y is an ion-exchange capacity of the separator per 1 Ah of battery capacity (meq/Ah).

14 Claims, 6 Drawing Sheets

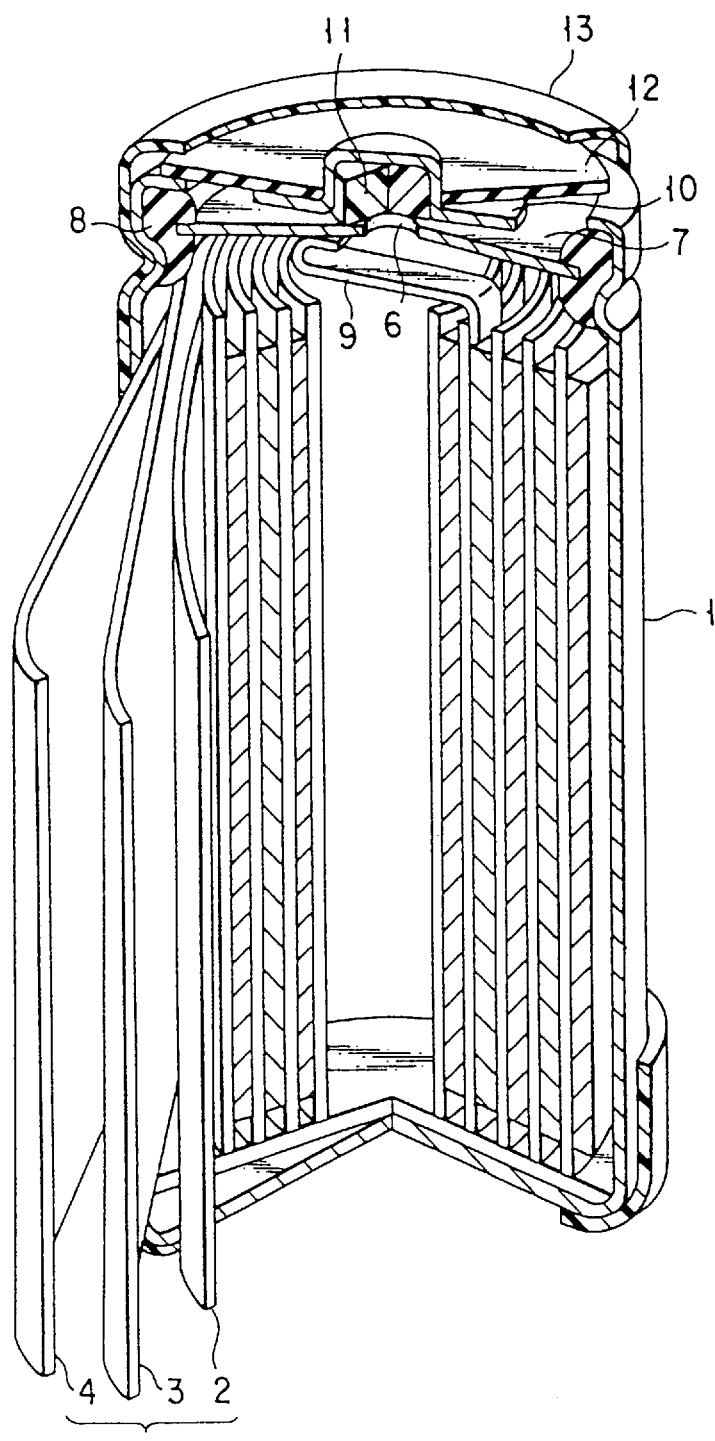
F I G. 1

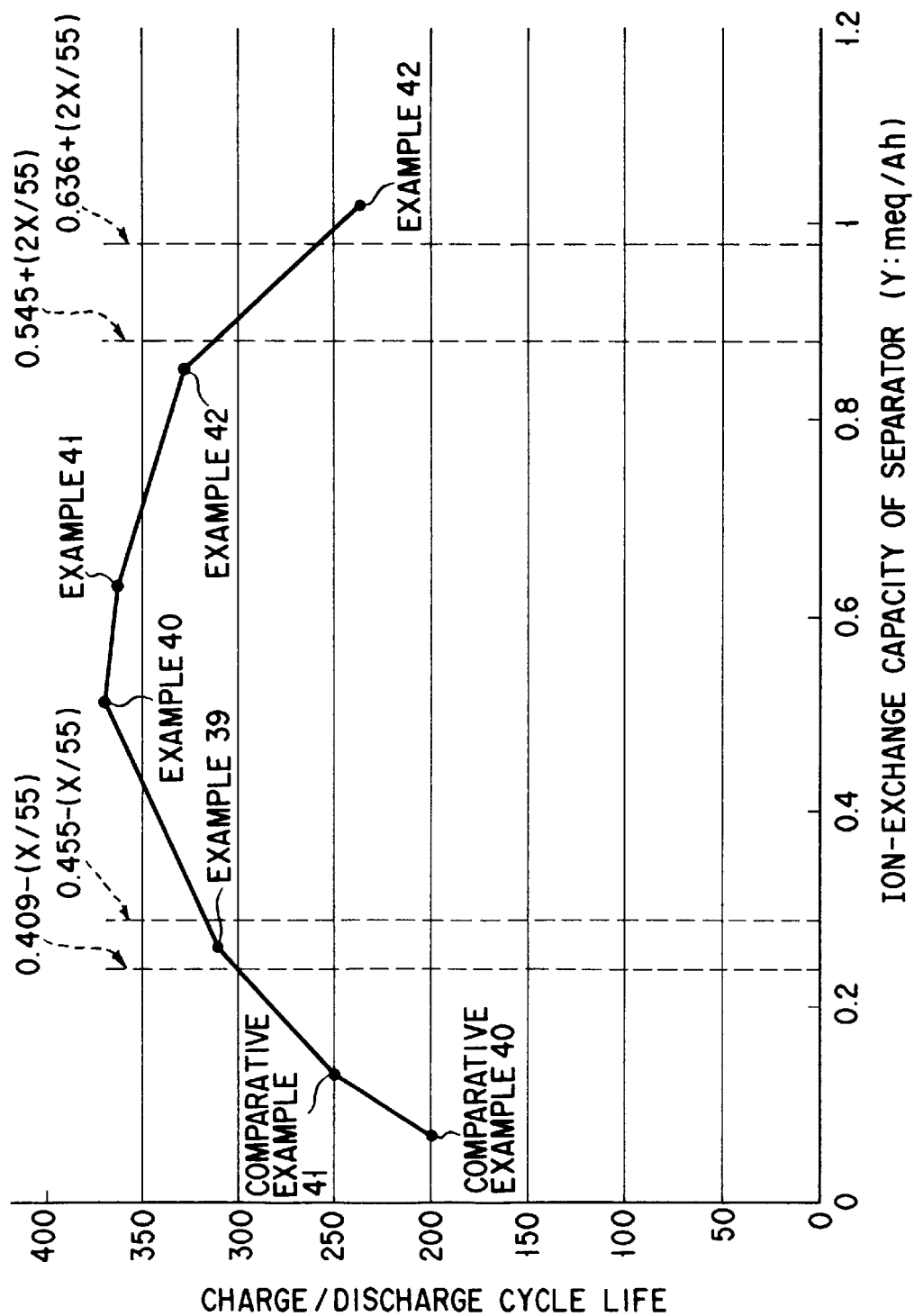
F I G. 5

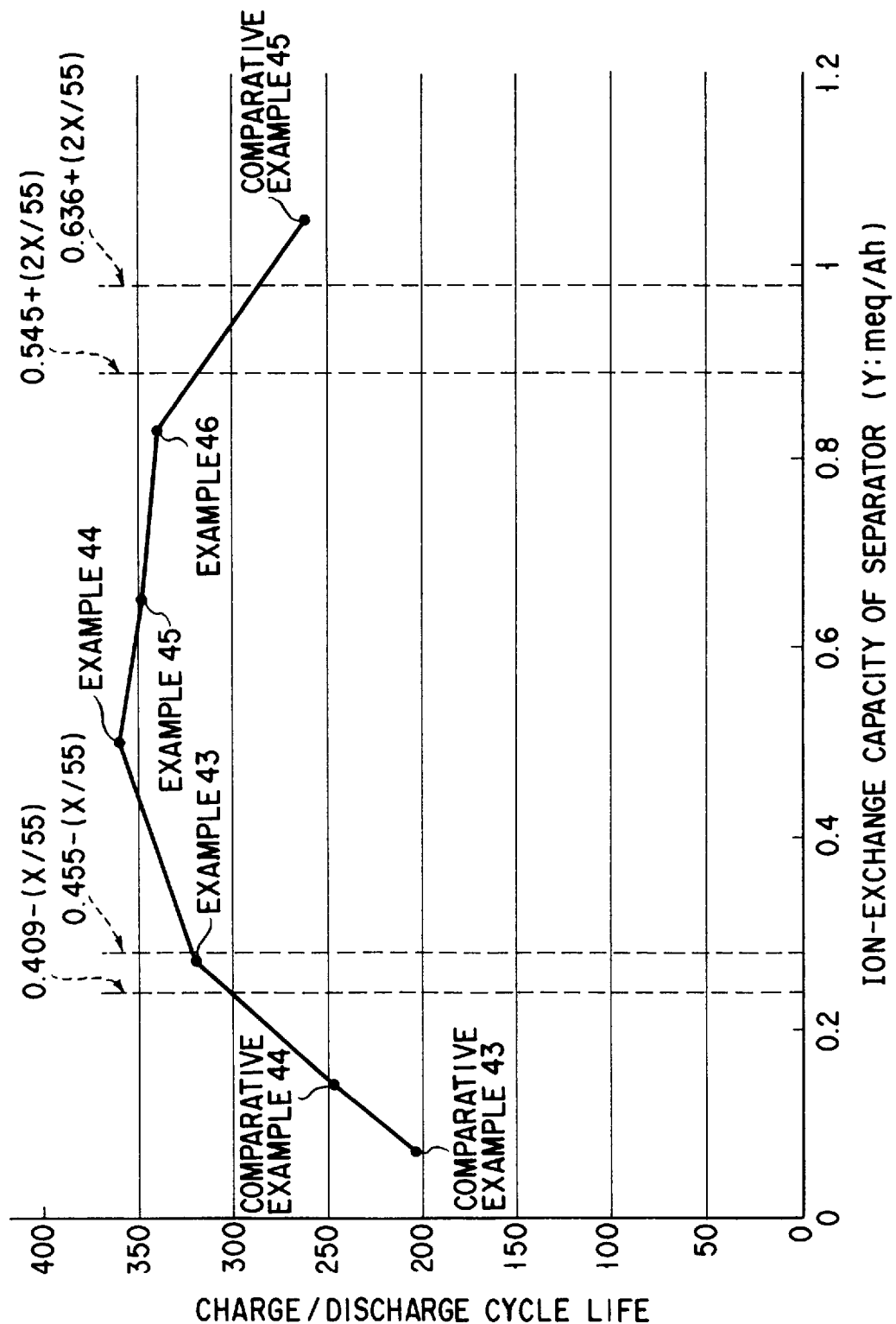
F I G. 6

NICKEL-HYDROGEN SECONDARY BATTERY

BACKGROUND OF THE INVENTION

1. Field of the Invention

This invention relates to a nickel-hydrogen secondary battery and in particular to a nickel-hydrogen secondary battery wherein a separator to be interposed between a positive electrode and a negative electrode is improved.

2. Description of the Related Art

There is conventionally known a nickel-hydrogen secondary battery having a structure wherein a group of electrodes (an electrode assembly) comprising a paste-type positive electrode containing nickel hydroxide, a paste-type negative electrode containing a hydrogen-absorbing alloy and a separator interposed between these electrodes is accommodated in a vessel together with alkaline electrolyte. This nickel-hydrogen secondary battery is interchangeable, in terms of voltage, with a nickel-cadmium secondary battery comprising a negative electrode containing a cadmium compound in place of the above-mentioned hydrogen-absorbing alloy and is excellent in performance as it has a higher capacity as compared with the nickel-cadmium secondary battery.

There has been employed, as a separator for the nickel-hydrogen secondary battery, a polyamide-based fiber which has been extensively employed in the nickel-cadmium secondary battery. However, it is known that the separator comprising a polyamide-based fiber is accompanied with a drawback that impurities (for example, nitrate ion, nitrite ion or ammonia) are generated due to the hydrolysis of the separator in an alkaline electrolyte, giving rise to the acceleration of self-discharge of battery due to the repetition of reactions, i.e. an oxidative reaction of the impurities with the positive electrode and a reductive reaction of the impurities with the negative electrode.

In view of this problem, a polyolefin resin-based fiber, excellent in stability in an alkaline electrolyte, that has been subjected to a hydrophilization treatment because of its inherent hydrophobicity is now extensively employed as a separator for the battery. As for the method of the hydrophilization treatment, there are known a sulfonation treatment and a graft copolymerization treatment by making use of a hydrophilic polymer. However, there is still a demand for further improving the charge/discharge cycle life of the conventional nickel-hydrogen secondary battery.

On the other hand, International Publication (Publication No. WO 93/01622) discloses a nickel-hydrogen secondary battery wherein a separator having an ion-exchange capacity of 0.48 (meq/g) and comprising a nonwoven fabric composed of polypropylene single fiber having a thickness of 5 to 10 $\mu$m and graft-copolymerized with acrylic acid is employed, and at the same time a 30% solution of potassium hydroxide is employed as an electrolyte as set forth in Example 4 thereof.

SUMMARY OF THE INVENTION

Accordingly, the object of the present invention is to provide a nickel-hydrogen secondary battery which is provided with a separator containing olefin-containing-polymer based synthetic resin fibers and having an excellent stability and which is improved in charge/discharge cycle life.

Namely, according to the present invention, there is provided a nickel-hydrogen secondary battery comprising;
a positive electrode containing nickel hydroxide;
a negative electrode containing a hydrogen-absorbing alloy;
a separator interposed between the positive electrode and the negative electrode and containing polyolefin based fibers having an ion-exchange group; and
an alkaline electrolyte having a normality of 5 or more in concentration;
wherein the separator satisfies the following equation (1):

$$\{0.409-(X/55)\} \leq Y \leq \{0.636+(2X/55)\} \tag{1}$$

where X is a chemical equivalent of alkaline electrolyte per 1 Ah of battery capacity (meq/Ah) and Y is an ion-exchange capacity of the separator per 1 Ah of battery capacity (meq/Ah).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a partially sectioned perspective view showing a nickel-hydrogen secondary battery according to one embodiment of the present invention;

FIG. 5 is a graph showing changes in charge/discharge cycle life as the ion-exchange capacity Y of the separator was changed in the nickel-hydrogen secondary batteries as shown in Examples 39 to 42 of this invention and in Comparative Examples 40 to 42; and FIG. 6 is a graph showing changes in charge/discharge cycle life as the ion-exchange capacity Y of the separator was changed in the nickel-hydrogen secondary batteries as shown in Examples 43 to 46 of this invention and in Comparative Examples 43 to 45.

DETAILED DESCRIPTION OF THE PREFERRED EMBODIMENTS

Figure 2:
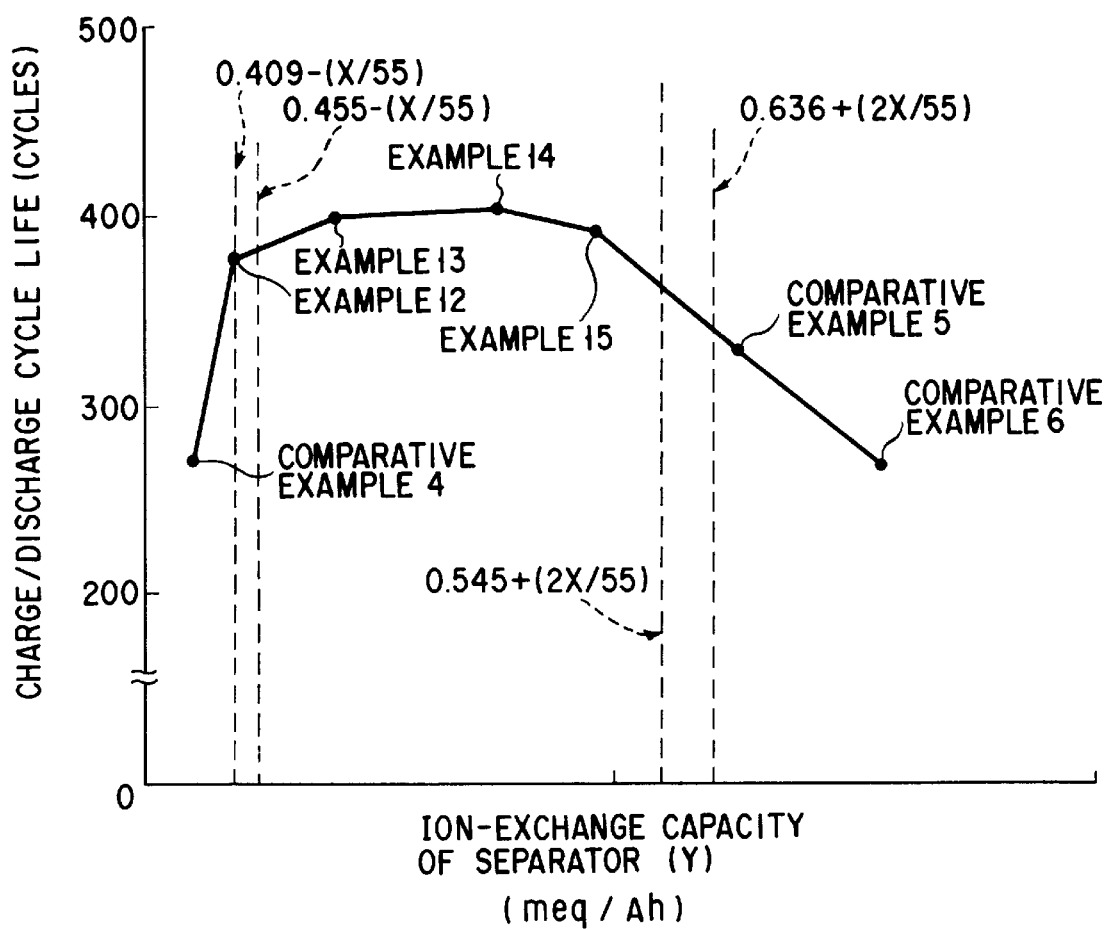
FIG. 2 is a graph showing changes in charge/discharge cycle life as the ion-exchange capacity Y of the separator was changed in the nickel-hydrogen secondary batteries as shown in Examples 12 to 15 of this invention and in Comparative Examples 4 to 6.

This invention will be further explained with reference to a nickel-hydrogen secondary battery (a cylindrical nickel-hydrogen secondary battery) shown in FIG. 1 as follows.

Referring to FIG. 1, a bottomed cylindrical vessel 1 is accommodated therein with an electrode assembly 5 which has been manufactured by spirally winding a stacked body comprising a positive electrode 2, a separator 3 and a negative electrode 4. The negative electrode 4 is disposed at the outermost periphery of the electrode assembly 5 so as to electrically contact with the cylindrical vessel 1. The cylindrical vessel 1 contains an alkaline electrolyte. A first sealing plate 7 formed of a disk having an opening 6 at the center is disposed on the upper opening of the cylindrical vessel 1. An insulating gasket 8 having a ring-like shape is interposed between the periphery of the first sealing plate 7 and the inner wall of the upper opening of the cylindrical vessel 1. The peripheral fringe portion of the upper opening of the cylindrical vessel 1 is caulked inward so that the first sealing plate 7 is hermetically fixed via the gasket 8 to cylindrical vessel 1. A positive electrode lead 9 is mounted such that it is connected through its one end to the positive electrode 2 and through its other end to the lower surface of the first sealing plate 7. A positive electrode terminal 10 having a hat-like shape is mounted over the first sealing plate 7 in such a manner as to cover the opening 6. A safety valve 11 formed of rubber is disposed in a space formed between the first sealing plate 7 and the positive electrode terminal 10 so as to seal the opening 6. A holding plate 12 formed of an insulating disk having a central opening is disposed over the positive electrode terminal 10 in such a manner that the projected portion of the positive electrode terminal 10 is protruded out through the central opening of the holding plate 12. An envelope tube 13 is disposed to cover all of the periphery of the holding plate 12, the outer side wall of the cylindrical vessel 1 and the periphery of the bottom of the cylindrical vessel 1.

Next, the details of the positive electrode 2, the separator 3, the negative electrode 4 and the electrolyte will be explained.

(1) The positive electrode 2

This positive electrode 2 can be manufactured by a process wherein a conductive material is added first to an active material, e.g. nickel hydroxide powder, and the resultant mixture is kneaded together with a polymeric binder and water to prepare a paste, which is then stuffed into an electroconductive substrate and, after being dried, molded into a predetermined shape.

As for the nickel hydroxide, one containing coprecipitated zinc and cobalt may be employed.

As for the conductive material, cobalt oxide such as CoO, cobalt hydroxide such as $Co(OH)_2$ or metallic cobalt can be used. Among them, CoO and $Co(OH)_2$ are more preferable.

Examples of polymeric binder useful in this case are a hydrophobic polymer such as polytetrafluoroethylene (PTFE), polyethylene and polypropylene; a hydrophilic polymer such as carboxymethyl cellulose (CMC), methyl cellulose (MC), hydroxypropylmethyl cellulose (HPMC), a polyacrylate {for example, sodium polyacrylate (SPA)}, polyvinyl alcohol (PVA) and polyethylene oxide; and a rubbery polymer such as latex.

The electroconductive substrate may be made up from nickel, stainless steel or a nickel-plated resin which is formed into a porous metallic body such as a mesh-like, sponge-like, fibrous or felt-like metallic porous body.

(2) The negative electrode 4

This negative electrode 4 can be manufactured by a process wherein a conductive material is first added to a hydrogen-absorbing alloy powder, and the resultant mixture is kneaded together with a polymeric binder and water to prepare a paste, which is then stuffed into an electroconductive substrate and, after being dried, molded into a predetermined shape.

As for the hydrogen-absorbing alloy, there is no specific limitation and any materials can be employed as far as it is capable of absorbing hydrogen generated electrochemically in an electrolyte and also capable of readily releasing the hydrogen thus absorbed at the time of discharge. Examples of the hydrogen-absorbing alloy are $LaNi_5$; $MmNi_5$ (Mm: misch metal); $LmNi_5$ (Lm: lanthanum-rich misch metal); a multi-element system wherein a portion of Ni of the above mentioned compounds is substituted by an element such as Al, Mn, Co, Ti, Cu, Zn, Zr, Cr and B; TiNi-based alloy; TiFe-based alloy; ZrNi-based alloy; and MgNi-based alloy. Among them, a compound having a general formula, $LmNi_xMn_yA_z$ (wherein A represents at least one element selected from Al and Co, and the total of atomic ratios of x, y and z meets the equation of $4.8 \leq x+y+z \leq 5.4$) is more preferable for use, since a negative electrode containing this kind of hydrogen-absorbing alloy is capable of inhibiting the pulverization thereof that might be caused in the process of charging/discharging cycle, thus improving the charging/discharging cycle life of the nickel-hydrogen secondary battery.

As for the polymeric binder, the same materials as employed for the positive electrode 2 can be used.

As for the conductive material, carbon black or activated carbon for instance can be used.

The electroconductive substrate may be formed from a two-dimensional substrate such as a punched metal, expanded metal or a nickel net, or from a three-dimensional substrate such as a felt-like metallic porous body or sponge-like metallic substrate.

(3) Alkaline electrolyte

Examples of the alkaline electrolyte useful in this invention are an aqueous solution of potassium hydroxide (KOH), an aqueous solution of lithium hydroxide (LiOH), an aqueous solution of sodium hydroxide (NaOH), a mixed solution of potassium hydroxide and lithium hydroxide, a mixed solution of potassium hydroxide and sodium hydroxide, a mixed solution of lithium hydroxide and sodium hydroxide, and a mixed solution of potassium hydroxide, lithium hydroxide and sodium hydroxide. Among them, more preferable electrolytes are ones which contain at least either lithium hydroxide or sodium hydroxide.

The concentration of the alkaline electrolyte should be 5N (normality) or more. If the alkali normality of the electrolyte is less than 5N, the conductivity of the electrolyte would be deteriorated thereby failing to obtain an excellent charging/discharging property and deteriorating the charging/discharging cycle life of the battery. If the concentration of alkaline electrolyte is selected to be 7 to 8N, an alkaline electrolyte of high conductivity can be obtained. It is also possible to employ a saturated solution of alkali as an alkaline electrolyte. When the alkaline electrolyte contains one alkali component, the upper limit of the concentration of the alkaline electrolyte corresponds to the concentration in the saturation solution of the alkali component. When the alkaline electrolyte contains at least two alkali components (for example LiOH and KOH), the upper limit of the concentration of the alkaline electrolyte corresponds to the concentration in the saturation solution of the alkali components. The concentration in the saturation solution of alkali differs depending on the kinds of alkali constituting the solute in the electrolyte, but generally is in the range of about 9 to 10N.

When the electrolyte contains at least lithium hydroxide, the concentration of lithium hydroxide in the electrolyte should preferably be in the range of 0.1N to 1.5N. If the concentration of lithium hydroxide in the electrolyte falls outside the aforementioned range, the charge/discharge cycling property as well as the self-discharge property during the storage at high temperature of the nickel-hydrogen secondary battery may be deteriorated. More preferable range of the concentration of lithium hydroxide in the electrolyte is 0.3N to 1.3N.

When the electrolyte contains at least sodium hydroxide, the concentration of sodium hydroxide in the electrolyte should preferably be in the range of 0.5N to 6.0N. If the concentration of sodium hydroxide in the electrolyte falls outside the aforementioned range, the charge/discharge cycling property as well as the self-discharge property during the storage at high temperature of the nickel-hydrogen secondary battery may be deteriorated. More preferable range of the concentration of lithium hydroxide in the electrolyte is 1.0N to 5.0N.

The chemical equivalent of alkaline electrolyte "X (meq/Ah)" per 1 Ah of battery capacity of the alkaline electrolyte can be calculated from the following equation (I) wherein the normality of the electrolyte is represented by $Z_0N$, the volume of the electrolyte by Vml and the capacity (nominal capacity) of battery by $C_0Ah$:

Chemical equivalent of alkaline electrolyte
$$X(\text{meq/Ah}) = (Z_0 \times V)/C_0 \quad (I)$$

The term "nominal capacity $C_0$" means the capacity which the battery has to discharge with a current of 0.2C mA until its voltage falls to 1.0 V, where 0.2C (mA) is calculated according to the following equation (α).

$$0.2C = 0.2 \times D \quad (\alpha)$$

wherein D (mA) is a current at which the designed capacity (mAh) of the battery is completely discharged in an hour. If the designed capacity is b mAh, D will be b mA.

Preferably, the chemical equivalent of alkaline electrolyte X should be in the range of 5 to 24 meq/Ah because of the following reasons. Namely, if the chemical equivalent of alkaline electrolyte X is less than 5 meq/Ah, the discharge capacity of the secondary battery may be deteriorated due to a lowering of charging/discharging reaction efficiency, thus shortening the cycle life of the secondary battery. On the other hand, if the chemical equivalent of alkaline electrolyte X exceeds over 24 meq/Ah, the volume of the electrolyte may become too excessive, thus badly affecting the performance such as safety of the secondary battery. The chemical equivalent of alkaline electrolyte X should more preferably be in the range of 6 to 21 meq/Ah, most preferably in the range of 7 to 19 meq/Ah.

(4) The separator 3

The separator 3 contains polyolefin based fibers having an ion-exchange group.

The separator 3 may be formed of a sheet material containing polyolefin based fibers, at least part of the fibers desirably having an ion-exchange group. Namely, all of the polyolefin based fibers contained in the sheet material may be possessed of an ion-exchange group, or only a portion of the polyolefin based fibers in the sheet material may be possessed of an ion-exchange group. As for the sheet material containing polyolefin based fibers, a nonwoven fabric containing the above-mentioned fibers to which an ion-exchange group is at least partially attached, a woven fabric containing the above-mentioned fibers to which an ion-exchange group is at least partially attached, a composite sheet composed of a lamination of a plurality of the aforementioned nonwoven fabrics, a composite sheet composed of a lamination of a plurality of the aforementioned woven fabrics, or a composite sheet composed of a lamination of the combination of the aforementioned nonwoven fabric and the aforementioned woven fabric may be used.

In the aforementioned composite sheet is to be employed, the average thickness (average fiber diameter) of the fibers contained in each fabric layer constituting the composite sheet may be identical with or different from each other.

A preferable example of the aforementioned composite sheet is of a 3-ply structure, which comprises an inner layer (a core layer) containing polyolefin based fibers, at least part of the fibers having an ion-exchange group, and a couple of surface layers superimposed on the both surfaces of the inner layer, each containing polyolefin based fibers, at least part of which having an ion-exchange group, wherein the average fiber diameter of fibers contained in the surface layers is larger than the average fiber diameter of fibers contained in the inner layer. The average fiber diameter of the fibers contained in both surface layers constituting the composite sheet may be identical with each other or different from each other.

It is possible according to the separator formed of this 3-ply composite sheet to assure a sufficient mechanical strength by the couple of surface layers and at the same time to retain a large amount of electrolyte by the inner layer, thus providing a separator which is high in mechanical strength and excellent in retainability of electrolyte. Therefore, a nickel-hydrogen secondary battery provided with this separator would exhibit a remarkably improved cycle life.

In the case of this 3-ply composite sheet, the average fiber diameter of the fibers in the inner layer should preferably be in the range of 0.5 $\mu$m to 5 $\mu$m, and the average fiber diameter of the fibers in the surface layers should preferably be in the range of 7 $\mu$m to 20 $\mu$m.

The reason for limiting the average fiber diameter in the inner layer to the aforementioned range is as follows. Namely, if the average fiber diameter is less than 0.5 $\mu$m, the strength of the separator may be deteriorated thus making the separator useless. On the other hand, if the average fiber diameter exceeds over 5 $\mu$m, the electrolyte-retaining capacity of the separator may be decreased. More preferable average fiber diameter in the inner layer is in the range of 1 $\mu$m to 3 $\mu$m.

The reason for limiting the average fiber diameter in the surface layers to the aforementioned range is as follows. Namely, if the average fiber diameter is less than 7 $\mu$m, the sufficient mechanical strength of the separator may not be assured thus making the separator useless. On the other hand, if the average fiber diameter exceeds over 20 $\mu$m, the electrolyte-retaining capacity of the separator may be decreased. More preferable average fiber diameter in the surface layers is in the range of 8 $\mu$m to 15 $\mu$m.

As for the examples of the polyolefin based fibers, (A) polyolefin single fibers, (B) composite fibers of core-sheath structure comprising a polyolefin core fiber whose surface is coated with another polyolefin of different kind from that of the core fiber, (C) composite fibers of partition type structure wherein a plurality of polyolefin fibers are connected side by side forming a circle, (D) fibers formed of copolymer resin consisting of olefin (for example, ethylene, propylene and butene, and (E) fibers formed of copolymer resin consisting of olefin and any monomer other than olefin may be employed. As for the examples of polyolefin, polyethylene and polypropylene may be used. Among these fibers, fibers (A) to (D)) are preferable.

The average diameter of the polyolefin based fibers to be contained in the aforementioned sheet material should preferably be in the range of 0.5 to 15 $\mu$m. If only the average diameter is minimized while maintaining the values of the weight per unit area and the thickness of the sheet material as they are, the fibers are caused to entangle with each other more closely, thus minimizing the apertures in the fibers thereby increasing the volume of electrolyte that can be retained by the apertures and resulting in an improved electrolyte-retaining capacity of the separator. However, if the average diameter is minimized, the mechanical strength of the separator will be deteriorated. On the other hand, if the average diameter is enlarged, the fibers are caused to entangle with each other more coarsely, thus enlarging the apertures in the fibers thereby decreasing the volume of electrolyte that can be retained by the apertures and resulting in a poor electrolyte-retaining capacity of the separator. On the other hand, if the aperture in the fibers is enlarged, the covering efficiency of the separator may be deteriorated. Therefore, if the average fiber diameter is less than 0.5 $\mu$m, the deterioration in mechanical strength of the separator may become so conspicuous that the assembling of the battery may become impossible. On the other hand, if the average fiber diameter exceeds over 15 $\mu$m, a short circuit between the positive electrode and the negative electrode may become frequent due to the deterioration in coverage efficiency of the separator. A separator which is provided with a sheet material containing polyolefin based fibers having an average fiber diameter ranging from 0.8 to 12 $\mu$m is particularly suitable since such a separator will exhibit a suitable mechanical strength and electrolyte-retaining capacity due to a high density of the sheet material.

As for the ion-exchange group, carboxyl group (COOH group), sulfonic group ($SO_3H$ group) and hydroxide group (OH group) may be exemplified. One or two or more kinds of these ion-exchange groups may be employed. As for the hydroxide group, one which is capable of exhibiting a strong acidity as it is attached to polyolefin-based fibers may be preferable. Among these ion-exchange groups, carboxyl group is preferable.

The ion-exchange capacity Y (meq/Ah) of the aforementioned separator per 1 Ah of battery capacity can be measured by the titration process as explained below.
(Titration process)

First of all, 0.5 to 1 g of a sample (for example, a polyolefin nonwoven fabric which has been subjected to graft-polymerization with acrylic acid) is taken into a 100 ml polyethylene wide-mouthed bottle and 100 ml of 1N-HCl solution is introduced into the bottle. After sinking completely the sample into the solution if the sample is still floating on the surface of the solution, the resultant mixture was left to stand for one hour in a thermostatic chamber kept at a temperature of 60° C. Subsequently, the sample is transferred into a beaker containing 200 ml of ion-exchanged water, and then stirred with a glass rod to wash the sample while exchanging the ion-exchanged water until the pH of the washing liquid becomes 6 to 7. After finishing the washing, the water is removed from the sample, spread over the surface of a stainless steel tray, and then dried in a desiccator cabinet kept at a temperature of 100° C. for one hour. After being cooled, the weight of the sample is measured up to 0.1 mg, and then taken into a 100 ml polyethylene wide-mouthed bottle to which is then added 110 g±0.01 g of 0.01N-KOH solution. On the other hand, 110 g±0.01 g of 0.01N-KOH as a blank sample is put into a 100 ml polyethylene wide-mouthed bottle. Thereafter, these bottles are housed in a thermostatic chamber kept at a temperature of 60° C. for two hours while gently stirring the solution in these bottles at every 30 minutes. Subsequently, the bottles are gently shaken and then the samples are taken out of the bottles to be cooled down to room temperature.

After being cooled, 100 g of each sample is transferred to a 200 ml conical beaker measuring the sample up to 0.01 g. Phenolphthalein is used as an indicator, and the sample is subjected to a neutralization titration with 0.1N-HCl solution. The solution of the blank sample is also treated in the same manner and subjected to a neutralization titration with 0.1N-HCl solution. Through this titration, the potassium ion exchange degree (meq/g) is calculated according to the following equation.

$$I.E.C.=[T2\times(S1/S2)-T1]/W1\times(E1/S1)\times0.1\times F$$

wherein,

I.E.C.: Potassium ion exchange capacity (meq/g).
T1: The amount (ml) of 0.1N-HCl solution required for the titration of the sample solution (ml).
T2: The amount (ml) of 0.1N-HCl solution required for the titration of the blank sample solution
S1: The weight of the sample solution taken out (g).
S2: The weight of the blank sample solution taken out (g).
W1: The weight of the sample solution after drying (g).
E1: The weight of 0.01N-KOH solution added (g).
F: Factor of 0.1N-HCl solution.

The ion-exchange capacity (potassium ion exchange capacity) Y (meq/Ah) of the aforementioned sample per 1 Ah of battery capacity can be calculated according to the following equation (II):

$$Y=(Y_0\times W)/C_0 \quad (II)$$

wherein $Y_0$ represents the potassium ion exchange capacity (meq/g) of the aforementioned sample; W is the weight (g) of the aforementioned sample; and $C_0$ is the capacity (nominal capacity) (Ah) of the battery provided with the aforementioned sample as a separator.

As seen from the equation (II), the weight Wg is applied, instead of the weight per unit area ($g/m^2$), to obtain ion-exchange capacity Y. This is because the separators have different weights even if they have the same size and the weight per unit area remains unchanged, inevitably because of the non-uniformity of waving inherent in the sheet (or strip) from which the separators have been cut.

The ion-exchange capacity Y (meq/Ah) of the aforementioned separator per 1 Ah of battery capacity meets the following equation (1) when a chemical equivalent of alkaline electrolyte per 1 Ah of battery capacity of an alkaline electrolyte having a normality of 5 or more in concentration is defined as X (meq/Ah):

$$\{0.409-(X/55)\}\leq Y\leq\{0.636+(2X/55)\} \quad (1)$$

The reason for employing a separator whose ion-exchange capacity Y (meq/Ah) meets the aforementioned equation (1) is as follows. If the ion-exchange capacity Y (meq/Ah) of the aforementioned separator per 1 Ah of battery capacity is smaller than the value to be obtained by the following equation (2), the electrolyte-retaining capacity of the separator would be deteriorated, thus decreasing the charging/discharging cycle life.

$$Y=\{0.409-(X/55)\} \quad (2)$$

In a nickel-hydrogen secondary battery, the swelling of the positive electrode or the corrosion of the hydrogen-absorbing alloy in the negative electrode are caused to generate in the process of charging/discharging cycle, thus consuming the electrolyte. If the amount of electrolyte in the positive electrode as well as in the negative electrode becomes insufficient due to the aforementioned reactions, the electrolyte in the separator is transferred to the positive electrode and/or the negative electrode in order to make up for the shortage of the electrolyte therein. In the case of a separator whose ion-exchange capacity Y is smaller than the value to be obtained from the aforementioned equation (2), the electrolyte-retaining capacity thereof is low so that the ratio of the electrolyte transferring to the positive electrode and/or the negative electrode will be increased in the process of charging/discharging cycle. As a result, the amount of electrolyte in the separator will be extremely decreased in the process of the charging/discharging cycle, thereby lowering the conductivity of the separator and deteriorating the charging/discharging cycle life of the battery.

The ion-exchange capacity Y required at least for realizing an excellent charging/discharging cycle performance will be decreased according to the aforementioned equation (2) as the chemical equivalent of alkaline electrolyte X is increased. In other words, as the chemical equivalent of alkaline electrolyte X of a secondary battery becomes higher, the minimum value of the ion-exchange capacity Y that is required for assuring an excellent charging/discharging cycle performance of the secondary battery would be extended to a lower value. The reason for this may be ascribed to the following mechanism.

Namely, when the ion-exchange capacity Y of the separator is small, the possibility of generating the transfer of electrolyte to the positive or negative electrode of the separator in the process of charging/discharging cycle is much more influenced by the viscosity of the electrolyte rather than by the amount of ion-exchange group in the separator. In the case of nickel-hydrogen secondary battery, there is a limitation on the amount of alkaline electrolyte that can be accommodated in the vessel, so that, if the capacity (nominal capacity) of the battery is assumed to be constant, the higher the chemical equivalent of alkaline electrolyte (X) per 1 Ah of battery capacity is, the more likely the concentration of alkaline electrolyte employed in the battery becomes higher. The electrolyte which is high in chemical equivalent of alkaline electrolyte (X) is high in viscosity and low in mobility because of its high concentration, so that it is possible to inhibit the electrolyte in the separator from transferring into the positive electrode r the negative electrode in the process of charging/discharging cycle. As a result, it is possible with this nickel-hydrogen secondary battery provided with such an electrolyte to assure an excellent charging/discharging cycle property by making use of a separator having a lesser amount of ion-exchange group than that in a separator to be employed in a nickel-hydrogen secondary battery where an electrolyte which is low in chemical equivalent (X) is employed.

On the other hand, if the ion-exchange capacity Y (meq/Ah) of the aforementioned separator per 1 Ah of battery capacity is larger than the value to be obtained by the following equation (3), the amount of the electrolyte to be distributed to the positive electrode and the negative electrode in the initial stage of charging/discharging cycle become insufficient, whereby shortening the charging/discharging cycle life.

$$Y = \{0.636 + (2X/55)\} \quad (3)$$

Namely, since the electrolyte-retaining capacity of the separator would become higher than required, the amount of electrolyte to be distributed to the positive electrode and the negative electrode becomes correspondingly decreased. Since a sufficient supply of $H_2O$ is required for effecting the charging/discharging of the positive electrode, the charging/discharging reaction efficiency as well as the discharge capacity of the positive electrode will be deteriorated if the supply of electrolyte to the positive electrode is insufficient.

Additionally, when the electrolyte is initiated to be consumed by the swelling of the positive electrode or by the corrosion reaction of the hydrogen-absorbing alloy in the negative electrode in the process of charging/discharging cycle, the shortage of electrolyte at the positive electrode becomes serious. As a result, the lowering of charging/discharging capacity is caused to initiate at a relatively early stage, thus deteriorating the charging/discharging cycle life of the battery.

As the chemical equivalent of the electrolyte X becomes higher, the maximum value of the ion-exchange capacity Y that is required for assuring an excellent charging/discharging cycle performance of the secondary battery would be extended higher. This allowable upper limit may be varied according to the aforementioned equation (3). The reason for this may be ascribed to the following mechanism.

Namely, if the ion-exchange capacity Y of the separator is assumed to be constant, as the chemical equivalent of the electrolyte X (the concentration of electrolyte) becomes higher, the affinity between the alkali metal ion and $H_2O$ becomes higher as compared with the affinity between the ion-exchange group and $H_2O$. If the ion-exchange capacity Y of the separator is relatively large, this difference in affinity may become a cause for decreasing the amount of electrolyte that can be actually sustained by the separator in proportion to an increase in the chemical equivalent X, so that the electrolyte can be inhibited from being gathered at the separator. Therefore, in the case of a nickel-hydrogen secondary battery provided with a separator having a large ion-exchange capacity Y, the higher the chemical equivalent X (the concentration of electrolyte) is, the more it becomes easy to optimize the distribution of electrolyte to the positive electrode, the negative electrode and the separator in the initial stage of charging/discharging cycle.

Furthermore, it is more desirable that the ion-exchange capacity Y (meq/Ah) of the aforementioned separator per 1 Ah of battery capacity meets the following equation (4):

$$\{0.455 - (X/55)\} \leq Y \leq \{0.545 + (2X/55)\} \quad (4)$$

The thickness of the separator should preferably be in the range of 0.15 mm to 0.3 mm.

The weight per unit area of the separator should preferably be 30 $g/m^2$ to 70 $g/m^2$. If the weight per unit area of the separator is less than 30 $g/m^2$, the strength of the separator may be undesirably lowered. On the other hand, if the weight per unit area of the separator exceeds over 70 $g/m^2$, the capacity of the battery may be lowered. A more preferable range of the weight per unit area of the separator is 40 $g/m^2$ to 60 $g/m^2$.

The separator can be manufactured for instance by graft-copolymerizing a sheet material comprising polyolefin based fibers with a vinyl monomer having an ion-exchange group. The following methods (a) to (c) represent specific examples of the manufacturing methods.

(a) First, a sheet material comprising polyolefin-based fibers is dipped into a solution containing vinyl monomer having an ion-exchange group, and then pulled out of the solution. Then, an energy beam is irradiated onto the sheet material thereby causing the graft-polymerization of the vinyl monomer, thus manufacturing the separator.

(b) First, a sheet material comprising polyolefin-based fibers is irradiated with an energy beam, and then the resultant sheet material is dipped into a solution containing vinyl monomer having an ion-exchange group, thereby causing the graft-polymerization of the vinyl monomer, thus manufacturing the separator.

(c) A sheet material comprising polyolefin-based fibers is dipped into a solution containing vinyl monomer having an ion-exchange group, and concurrently, an energy beam is irradiated onto the sheet material thereby causing the graft-polymerization of the vinyl monomer, thus manufacturing the separator.

As for the sheet material comprising polyolefin-based fibers, a nonwoven fabric made of the polyolefin-based fibers, a woven fabric made of the polyolefin-based fibers, a composite sheet composed of a plurality of nonwoven fabrics superimposed one upon another, a composite sheet composed of a plurality of woven fabrics superimposed one upon another, and a composite sheet composed of nonwoven fabrics and woven fabric may be used. The nonwoven fabric can be manufactured by means of a dry process, a wet process, a spun bond method or a melt blow method. Among them, the spun bond method and melt blow method are preferable in view of possibility of manufacturing a nonwoven fabric constituted by fine fibers, which is effective in preventing the short circuit between the positive electrode and the negative electrode.

As for polyolefin-based fibers, the same kinds of fibers as explained above may be employed.

Examples of a vinyl monomer useful in this case are acrylic acid monomer, methacrylic acid monomer, acrylate or methacrylate monomer, vinylpyridine monomer, vinylpyrrolidone monomer, styrene sulfonate monomer, a vinyl monomer having a functional group which is capable of forming a salt through a reaction with an acid or base such as styrene monomer, and a vinyl monomer having a functional group which is capable of forming a salt through a hydrolysis. Among these vinyl monomers, acrylic acid monomer is most preferable.

As for the energy beam, an ultra-violet ray, an electron beam, an X-ray or other ionizing radiation can be employed.

In the embodiment shown in FIG. 1, the separator 3 is interposed between the negative electrode 4 and the positive electrode 2, and resultant structure is spirally wound and accommodated in the bottomed cylindrical vessel 1. However, the nickel-hydrogen secondary battery of this invention is not limited to such a construction. It is also possible to construct a nickel-hydrogen secondary battery in a rectangular shape which is adapted to accommodate an assembly comprising a plurality of laminates, each laminate being composed of a negative electrode, a positive electrode and a separator interposed between the negative electrode and the positive electrode.

As explained above, the nickel-hydrogen secondary battery according to the present invention comprises a separator containing polyolefin based fibers having an ion-exchange group, and an alkaline electrolyte having a normality of 5 or more in concentration; wherein a chemical equivalent of alkaline electrolyte per 1 Ah of battery capacity which is represented by X (meq/Ah) and an ion-exchange capacity of said separator per 1 Ah of battery capacity which is represented by Y (meq/Ah) meet the following equation (1):

$$\{0.409-(X/55)\} \leq Y \leq \{0.636+(2X/55)\} \quad (1)$$

Since the ion-exchange capacity of a separator per 1 Ah of battery capacity is controlled in this secondary battery by taking the chemical equivalent of alkaline electrolyte per 1 Ah of battery capacity into consideration, the charging/discharging cycle life of the battery can be improved.

Namely, since there is a limitation regarding the amount of alkaline electrolyte that can be accommodated in the vessel of the nickel-hydrogen secondary battery, the charging/discharging cycle life of the battery will be greatly influenced by the distribution conditions of alkaline electrolyte to all of the positive electrode, the negative electrode and the separator. If this distribution conditions are to be optimized, the relationship between the chemical equivalent of alkaline electrolyte per 1 Ah of battery capacity and the ion-exchange capacity of the separator per 1 Ah of battery capacity is very important. It should be noted that a nickel-hydrogen secondary battery provided with a separator which meets the aforementioned equation (1) is capable of optimizing the distribution conditions of electrolyte to the positive electrode, the negative electrode and the separator in the initial stage of charging/discharging cycle, and at the same time capable of inhibiting or avoiding the transfer of electrolyte from the separator to the positive electrode and the negative electrode in the process of charging/discharging cycle, whereby making it possible to retain an optimum distribution conditions of electrolyte for a long period of time and hence to improve the charging/discharging cycle life.

Furthermore, when the value of ion-exchange capacity Y (meq/Ah) of the aforementioned separator is controlled to meet the following equation (4), the charging/discharging cycle life of the battery can be extremely improved.

$$\{0.455-(X/55)\} \leq Y \leq \{0.545+(2X/55)\} \quad (4)$$

This invention will be further explained with reference to preferred examples and drawings.

EXAMPLE 1

(Preparation of a paste-type negative electrode)

With the employment of lanthanum-rich misch metal Lm, which is available in the market, Ni, Co, Mn and Al, and by making use of a high frequency furnace, a hydrogen-absorbing alloy having a composition of $LmNi_{4.0}Co_{0.4}Mn_{0.3}Al_{0.3}$ was prepared. This hydrogen-absorbing alloy was then pulverized by a mechanical means, and the pulverized material was sieved through a 200 mesh sieve. 100 parts by weight of the hydrogen-absorbing alloy powder thus sieved was mixed with 0.5 part by weight of sodium polyacrylate, 0.125 part by weight of carboxymethyl cellulose (CMC), 2.5 parts by weight (measured as a solid) of the dispersion of polytetrafluoroethylene (specific gravity: 1.5, solid portion: 60 wt%), 1.0 part by weight of carbon powder (a conductive material) and 50 part by weight of water thereby preparing a paste. This paste was coated over a punched metal, and after being dried, press-molded to form a paste-type negative electrode.

(Preparation of a paste-type positive electrode)

To a mixture consisting of 90 parts by weight of nickel hydroxide powder and 10 parts by weight of cobalt oxide powder were added 0.3 part by weight of carboxymethyl cellulose (CMC) and 0.5 parts by weight (measured as a solid) of the dispersion of polytetrafluoroethylene (specific gravity: 1.5, solid portion: 60 wt%) to obtain a mixture to which 45 parts by weight of demineralized water was added and the resultant mixture was kneaded to prepare a paste. This paste was then filled into a fibrous substrate plated with nickel and then the same paste was coated over the both surfaces of the substrate. After being dried, the substrate was rolled to obtain a paste-type positive electrode.

(Preparation of a separator)

A nonwoven fabric having an average fiber diameter of 1.0 μm, a weight per unit area of 50 g/m² and a thickness of 0.20 mm was prepared from polypropylene resin according to a spun bond method. Thereafter, this nonwoven fabric was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 50.7 g/m$^2$, the weight "W" of the separator being 0.550 g.

When the graft-copolymerization ratio of the acrylic acid monomer of the separator thus obtained was measured by a titration method, the potassium ion exchange capacity $Y_0$ per 1 g of the separator was found 0.200 meq/g.

This separator was then interposed between the negative electrode and the positive electrode, and the resultant composite sheet was spirally wound to form an electrode assembly. Then, this electrode assembly and 2.30 ml of an alkaline electrolyte having a normality of 9.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0$=9.00N; V=2.30 ml; and $C_0$=1.10 Ah), X was found to be 18.8. This value of X was then introduced into the aforementioned equation (1): $\{40.409-(X/55)\} \leq Y \leq \{0.636+(2X/55)\}$ to obtain the following equation (a):

$$0.067 \leq Y \leq 1.32 \qquad (a)$$

On the other hand, when the ion exchange capacity "Y" of the separator per 1 Ah of battery capacity was calculated from the aforementioned equation (II): $Y=(Y_0 \times W)/C_0$ ($Y_0$=0.200 meq/g; W=0.550 g; and $C_0$=1.10 Ah), Y was found to be 0.100 meq/Ah.

EXAMPLE 2

A nickel-hydrogen secondary battery was manufactured by repeating the same procedures as employed in Example 1 by making use of the same types of separator, positive electrode, negative electrode and electrolyte as employed in Example 1 except that the potassium ion exchange capacity $Y_0$ per 1 g of the separator as measured by means of a titration method was 0.400 meq/g and the weight "W" of the separator was 0.523 g. When the ion exchange capacity "Y" of the separator per 1 Ah of battery capacity of the resultant secondary battery was calculated from the aforementioned equation (II), Y was found to be 0.190 meq/Ah.

EXAMPLE 3

A nickel-hydrogen secondary battery was manufactured by repeating the same procedures as employed in Example 1 by making use of the same types of separator, positive electrode, negative electrode and electrolyte as employed in Example 1 except that the potassium ion exchange capacity $Y_0$ per 1 g of the separator as measured by means of a titration method was 0.800 meq/g and the weight "W" of the separator was 0.495 g. When the ion exchange capacity "Y" of the separator per 1 Ah of battery capacity of the resultant secondary battery was calculated from the aforementioned equation (II), Y was found to be 0.360 meq/Ah.

EXAMPLE 4

A nickel-hydrogen secondary battery was manufactured by repeating the same procedures as employed in Example 1 by making use of the same types of separator, positive electrode, negative electrode and electrolyte as employed in Example 1 except that the potassium ion exchange capacity $Y_0$ per 1 g of the separator as measured by means of a titration method was 1.50 meq/g and the weight "W" of the separator was 0.499 g. When the ion exchange capacity "Y" of the separator per 1 Ah of battery capacity of the resultant secondary battery was calculated from the aforementioned equation (II), Y was found to be 0.680 meq/Ah.

EXAMPLE 5

A nickel-hydrogen secondary battery was manufactured by repeating the same procedures as employed in Example 1 by making use of the same types of separator, positive electrode, negative electrode and electrolyte as employed in Example 1 except that the potassium ion exchange capacity $Y_0$ per 1 g of the separator as measured by means of a titration method was 1.90 meq/g and the weight "W" of the separator was 0.492 g. When the ion exchange capacity "Y" of the separator per 1 Ah of battery capacity of the resultant secondary battery was calculated from the aforementioned equation (II), Y was found to be 0.850 meq/Ah.

EXAMPLE 6

A nickel-hydrogen secondary battery was manufactured by repeating the same procedures as employed in Example 1 by making use of the same types of separator, positive electrode, negative electrode and electrolyte as employed in Example 1 except that the potassium ion exchange capacity $Y_0$ per 1 g of the separator as measured by means of a titration method was 2.50 meq/g and the weight "W" of the separator was 0.506 g. When the ion exchange capacity "Y" of the separator per 1 Ah of battery capacity of the resultant secondary battery was calculated from the aforementioned equation (II), Y was found to be 1.15 meq/Ah.

Comparative Example 1

A nickel-hydrogen secondary battery was manufactured by repeating the same procedures as employed in Example 1 by making use of the same types of separator, positive electrode, negative electrode and electrolyte as employed in Example 1 except that the potassium ion exchange capacity $Y_0$ per 1 g of the separator as measured by means of a titration method was 3.10 meq/g and the weight "W" of the separator was 0.500 g. When the ion exchange capacity "Y" of the separator per 1 Ah of battery capacity of the resultant secondary battery was calculated from the aforementioned equation (II), Y was found to be 1.41 meq/Ah.

These secondary batteries obtained in Examples 1 to 6 and Comparative Example 1 were subjected to three cycles of charging/discharging wherein each battery was charged to a depth of 150% with a current of 1 CmA and discharged with a current of 1 CmA until the voltages thereof were lowered down to 1.0 V in each cycle. The discharge capacity at the third cycle was defined as an initial capacity. Thereafter, the charging/discharging cycle was repeated under the same conditions as mentioned above and the number of repetition of the cycle was counted until the discharge capacity fell down to 80% of the initial capacity, thereby calculating the charge/discharge cycle life of the batteries. The results are shown in Table 1.

As seen from Table 1, the charge/discharge cycle life of the secondary batteries according to Examples of 1 to 6 where the ion-exchange capacity "Y" of any of the separators was controlled fall within the range of 0.067 to 1.32 (meq/Ah) was found longer than that of the secondary battery according to Comparative Example 1.

EXAMPLE 7

A nonwoven fabric of the same kind as employed in Example 1 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 51.5 g/m$^2$, the weight "W" of the separator being 0.523 g. The separator thus obtained was measured by a titration method to find out the potassium ion exchange capacity $Y_0$ as being 0.400 meq/g.

This separator was then interposed between the negative electrode and the positive electrode in the same manner as in Example 1, and the resultant composite sheet was spirally wound to form an electrode assembly. Then, this electrode assembly and 2.30 ml of an alkaline electrolyte having a normality of 7.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0$=7.00N; V=2.30 ml; and $C_0$=1.10 Ah), X was found to be 14.6. This value of X was then introduced into the aforementioned equation (1): $\{0.409-(X/55)\} \leq Y \leq \{0.636+(2X/55)\}$ to obtain the following equation (b):

$$0.143 \leq Y \leq 1.17 \quad (b)$$

On the other hand, when the ion exchange capacity "Y" of the separator per 1 Ah of battery capacity was calculated from the aforementioned equation (II): $Y=(Y_0 \times W)/C_0$ ($Y_0$=0.400 meq/g; W=0.523 g; and $C_0$=1.10 Ah), Y was found to be 0.190 meq/Ah.

EXAMPLE 8

A nickel-hydrogen secondary battery was manufactured by repeating the same procedures as employed in Example 7 except that the potassium ion exchange capacity $Y_0$ of the separator as measured by means of a titration method was 0.800 meq/g and the weight "W" of the separator was 0.509 g. When the ion exchange capacity "Y" of the separator per 1 Ah of battery capacity of the resultant secondary battery was calculated from the aforementioned equation (II), Y was found to be 0.370 meq/Ah.

EXAMPLE 9

A nickel-hydrogen secondary battery was manufactured by repeating the same procedures as employed in Example 7 except that the potassium ion exchange capacity $Y_0$ of the separator as measured by means of a titration method was 1.50 meq/g and the weight "W" of the separator was 0.506 g. When the ion exchange capacity "Y" of the separator per 1 Ah of battery capacity of the resultant secondary battery was calculated from the aforementioned equation (II), Y was found to be 0.690 meq/Ah.

EXAMPLE 10

A nickel-hydrogen secondary battery was manufactured by repeating the same procedures as employed in Example 7 except that the potassium ion exchange capacity $Y_0$ of the separator as measured by means of a titration method was 1.90 meq/g and the weight "W" of the separator was 0.498 g. When the ion exchange capacity "Y" of the separator per 1 Ah of battery capacity of the resultant secondary battery was calculated from the aforementioned equation (II), Y was found to be 0.860 meq/Ah.

EXAMPLE 11

A nickel-hydrogen secondary battery was manufactured by repeating the same procedures as employed in Example 7 except that the potassium ion exchange capacity $Y_0$ of the separator as measured by means of a titration method was 2.50 meq/g and the weight "W" of the separator was 0.502 g. When the ion exchange capacity "Y" of the separator per 1 Ah of battery capacity of the resultant secondary battery was calculated from the aforementioned equation (II), Y was found to be 1.14 meq/Ah.

Comparative Example 2

A nickel-hydrogen secondary battery was manufactured by repeating the same procedures as employed in Example 7 except that the potassium ion exchange capacity $Y_0$ of the separator as measured by means of a titration method was 0.200 meq/g and the weight "W" of the separator was 0.605 g. When the ion exchange capacity "Y" of the separator per 1 Ah of battery capacity of the resultant secondary battery was calculated from the aforementioned equation (II), Y was found to be 0.110 meq/Ah.

Comparative Example 3

A nickel-hydrogen secondary battery was manufactured by repeating the same procedures as employed in Example 7 except that the potassium ion exchange capacity $Y_0$ of the separator as measured by means of a titration method was 3.10 meq/g and the weight "W" of the separator was 0.500 g. When the ion exchange capacity "Y" of the separator per 1 Ah of battery capacity of the resultant secondary battery was calculated from the aforementioned equation (II), Y was found to be 1.41 meq/Ah.

These secondary batteries obtained in Examples 7 to 11 and Comparative Examples 2 and 3 were subjected to the charging/discharging cycle test in the same manner as mentioned above to calculate the charge/discharge cycle life of the batteries. The results are shown in Table 2.

As seen from Table 2, the charge/discharge cycle life of the secondary batteries according to Examples of 7 to 11 where the ion-exchange capacity "Y" of any of the separators was controlled to fall within the range of 0.143 to 1.17 (meq/Ah) was found longer than that of the secondary battery according to Comparative Examples 2 and 3.

EXAMPLE 12

A nonwoven fabric of the same kind as employed in Example 1 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 51.5 g/m², the weight "W" of the separator being 0.495 g. The separator thus obtained was measured by a titration method to find out the potassium ion exchange capacity $Y_0$ as being 0.400 meq/g.

This separator was then interposed between the negative electrode and the positive electrode in the same manner as in Example 1, and the resultant composite sheet was spirally wound to form an electrode assembly. Then, this electrode assembly and 2.00 ml of an alkaline electrolyte having a normality of 7.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0$=7.00N; V=2.00 ml; and $C_0$=1.10 Ah), X was found to be 12.7. This value of X was then introduced into the aforementioned equation (1): $\{0.409-(X/55)\} \leq Y \leq \{0.636+(2X/55)\}$ to obtain the following equation (c):

$$0.178 \leq Y \leq 1.10 \quad (c)$$

On the other hand, when the ion exchange capacity "Y" of the separator per 1 Ah of battery capacity was calculated from the aforementioned equation (II): $Y=(Y_0 \times W)/C_0$ ($Y_0$=0.400 meq/g; W=0.495 g; and $C_0$=1.10 Ah), Y was found to be 0.180 meq/Ah.

EXAMPLE 13

A nickel-hydrogen secondary battery was manufactured by repeating the same procedures as employed in Example 12 except that the potassium ion exchange capacity $Y_0$ of the separator as measured by means of a titration method was 0.800 meq/g and the weight "W" of the separator was 0.509 g. When the ion exchange capacity "Y" of the separator per 1 Ah of battery capacity of the resultant secondary battery was calculated from the aforementioned equation (II), Y was found to be 0.370 meq/Ah.

EXAMPLE 14

A nickel-hydrogen secondary battery was manufactured by repeating the same procedures as employed in Example 12 except that the potassium ion exchange capacity $Y_0$ of the separator as measured by means of a titration method was 1.50 meq/g and the weight "W" of the separator was 0.506 g. When the ion exchange capacity "Y" of the separator per 1 Ah of battery capacity of the resultant secondary battery was calculated from the aforementioned equation (II), Y was found to be 0.690 meq/Ah.

EXAMPLE 15

A nickel-hydrogen secondary battery was manufactured by repeating the same procedures as employed in Example 12 except that the potassium ion exchange capacity $Y_0$ of the separator as measured by means of a titration method was 190 meq/g and the weight "W" of the separator was 0.504 g. When the ion exchange capacity "Y" of the separator per 1 Ah of battery capacity of the resultant secondary battery was calculated from the aforementioned equation (II), Y was found to be 0.870 meq/Ah.

Comparative Example 4

A nickel-hydrogen secondary battery was manufactured by repeating the same procedures as employed in Example 12 except that the potassium ion exchange capacity $Y_0$ of the separator as measured by means of a titration method was 0.200 meq/g and the weight "W" of the separator was 0.550 g. When the ion exchange capacity "Y" of the separator per 1 Ah of battery capacity of the resultant secondary battery was calculated from the aforementioned equation (II), Y was found to be 0.100 meq/Ah.

Comparative Example 5

A nickel-hydrogen secondary battery was manufactured by repeating the same procedures as employed in Example 12 except that the potassium ion exchange capacity $Y_0$ of the separator as measured by means of a titration method was 2.50 meq/g and the weight "W" of the separator was 0.506 g. When the ion exchange capacity "Y" of the separator per 1 Ah of battery capacity of the resultant secondary battery was calculated from the aforementioned equation (II), Y was found to be 1.15 meq/Ah.

Comparative Example 6

A nickel-hydrogen secondary battery was manufactured by repeating the same procedures as employed in Example 12 except that the potassium ion exchange capacity $Y_0$ of the separator as measured by means of a titration method was 3.10 meq/g and the weight "W" of the separator was 0.504 g. When the ion exchange capacity "Y" of the separator per 1 Ah of battery capacity of the resultant secondary battery was calculated from the aforementioned equation (II), Y was found to be 1.42 meq/Ah.

These secondary batteries obtained in Examples 12 to 15 and Comparative Examples 4 to 6 were subjected to the charging/discharging cycle test in the same manner as mentioned above to calculate the charge/discharge cycle life of the batteries. The results are shown in Table 3. Further, the ion-exchange capacity Y (meq/Ah) of the separator per 1 Ah of battery capacity was changed in the nickel-hydrogen secondary batteries to measure any changes in cycle life. The results are shown in FIG. 2.

As seen from Table 3 and FIG. 2, the charge/discharge cycle life of the secondary batteries according to Examples of 12 to 15 where the ion-exchange capacity "Y" of any of the separators was controlled to fall within the range of 0.178 to 1.10 (meq/Ah) was found longer than that of the secondary battery according to Comparative Examples 4 to 6.

EXAMPLE 16

A nonwoven fabric of the same kind as employed in Example 1 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 52.8 g/m², the weight "W" of the separator being 0.495 g. The separator thus obtained was measured by a titration method to find out the potassium ion exchange capacity $Y_0$ as being 0.800 meq/g.

This separator was then interposed between the negative electrode and the positive electrode in the same manner as in Example 1, and the resultant composite sheet was spirally wound to form an electrode assembly. Then, this electrode assembly and 2.30 ml of an alkaline electrolyte having a normality of 5.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0$=5.00N; V=2.30 ml; and $C_0$=1.10 Ah), X was found to be 10.5. This value of X was then introduced into the aforementioned equation (1): $\{0.409-(X/55)\} \leq Y \leq \{0.636+(2X/55)\}$ to obtain the following equation (d):

$$0.218 \leq Y \leq 1.02 \qquad (d)$$

On the other hand, when the ion exchange capacity "Y" of the separator per 1 Ah of battery capacity was calculated from the aforementioned equation (II): $Y=(Y_0 \times W)/C_0$ ($Y_0$= 0.800 meq/g; W=0.495 g; and $C_0$=1.10 Ah), Y was found to be 0.360 meq/Ah.

EXAMPLE 17

A nickel-hydrogen secondary battery was manufactured by repeating the same procedures as employed in Example 16 except that the potassium ion exchange capacity $Y_0$ of the separator as measured by means of a titration method was 1.50 meq/g and the weight "W" of the separator was 0.499 g. When the ion exchange capacity "Y" of the separator per 1 Ah of battery capacity of the resultant secondary battery was calculated from the aforementioned equation (II), Y was found to be 0.680 meq/Ah.

EXAMPLE 18

A nickel-hydrogen secondary battery was manufactured by repeating the same procedures as employed in Example 16 except that the potassium ion exchange capacity $Y_0$ of the separator as measured by means of a titration method was 190 meq/g and the weight "W" of the separator was 0.498 g. When the ion exchange capacity "Y" of the separator per 1 Ah of battery capacity of the resultant secondary battery was calculated from the aforementioned equation (II), Y was found to be 0.860 meq/Ah.

Comparative Example 7

A nickel-hydrogen secondary battery was manufactured by repeating the same procedures as employed in Example 16 except that the potassium ion exchange capacity $Y_0$ of the separator as measured by means of a titration method was 0.200 meq/g and the weight "W" of the separator was 0.550 g. When the ion exchange capacity "Y" of the separator per 1 Ah of battery capacity of the resultant secondary battery was calculated from the aforementioned equation (II), Y was found to be 0.100 meq/Ah.

Comparative Example 8

A nickel-hydrogen secondary battery was manufactured by repeating the same procedures as employed in Example 16 except that the potassium ion exchange capacity $Y_0$ of the separator as measured by means of a titration method was 0.480 meq/g and the weight "W" of the separator was 0.435 g. When the ion exchange capacity "Y" of the separator per 1 Ah of battery capacity of the resultant secondary battery was calculated from the aforementioned equation (II), Y was found to be 0.190 meq/Ah.

Comparative Example 9

A nickel-hydrogen secondary battery was manufactured by repeating the same procedures as employed in Example 16 except that the potassium ion exchange capacity $Y_0$ of the separator as measured by means of a titration method was 2.50 meq/g and the weight "W" of the separator was 0.506 g. When the ion exchange capacity "Y" of the separator per 1 Ah of battery capacity of the resultant secondary battery was calculated from the aforementioned equation (II), Y was found to be 1.15 meq/Ah.

Comparative Example 10

A nickel-hydrogen secondary battery was manufactured by repeating the same procedures as employed in Example 16 except that the potassium ion exchange capacity $Y_0$ of the separator as measured by means of a titration method was 3.10 meq/g and the weight "W" of the separator was 0.500 g. When the ion exchange capacity "Y" of the separator per 1 Ah of battery capacity of the resultant secondary battery was calculated from the aforementioned equation (II), Y was found to be 1.41 meq/Ah.

These secondary batteries obtained in Examples 16 to 18 and Comparative Examples 7 to 10 were subjected to the charging/discharging cycle test in the same manner as mentioned above to calculate the charge/discharge cycle life of the batteries. The results are shown in Table 4.

As seen from Table 4, the charge/discharge cycle life of the secondary batteries according to Examples of 16 to 18 where the ion-exchange capacity "Y" of any of the separators was controlled to fall within the range of 0.218 to 1.02 (meq/Ah) was found longer than that of the secondary battery according to Comparative Examples 7 to 10.

EXAMPLE 19

A nonwoven fabric of the same kind as employed in Example 1 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 52.8 g/m², the weight "W" of the separator being 0.495 g. The separator thus obtained was measured by a titration method to find out the potassium ion exchange capacity $Y_0$ as being 0.800 meq/g.

This separator was then interposed between the negative electrode and the positive electrode in the same manner as in Example 1, and the resultant composite sheet was spirally wound to form an electrode assembly. Then, this electrode assembly and 1.70 ml of an alkaline electrolyte having a normality of 5.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0$=5.00N; V 32 1.70 ml; and $C_0$=1.10 Ah), X was found to be 7.95. This value of X was then introduced into the aforementioned equation (1): $\{0.409-(X/55)\} \leq Y \leq \{0.636+(2X/55)\}$ to obtain the following equation (e):

$$0.264 \leq Y \leq 0.925 \quad (e)$$

On the other hand, when the ion exchange capacity "Y" of the separator per 1 Ah of battery capacity was calculated from the aforementioned equation (II): $Y=(Y_0 \times W)/C_0$ ($Y_0$=0.800 meq/g; W=0.495 g; and $C_0$=1.10 Ah), Y was found to be 0.360 meq/Ah.

EXAMPLE 20

A nickel-hydrogen secondary battery was manufactured by repeating the same procedures as employed in Example 19 except that the potassium ion exchange capacity $Y_0$ of the separator as measured by means of a titration method was 1.50 meq/g and the weight "W" of the separator was 0.513 g. When the ion exchange capacity "Y" of the separator per 1 Ah of battery capacity of the resultant secondary battery was calculated from the aforementioned equation (II), Y was found to be 0.700 meq/Ah.

EXAMPLE 21

A nickel-hydrogen secondary battery was manufactured by repeating the same procedures as employed in Example 19 except that the potassium ion exchange capacity $Y_0$ of the separator as measured by means of a titration method was 190 meq/g and the weight "W" of the separator was 0.498 g. When the ion exchange capacity "Y" of the separator per 1 Ah of battery capacity of the resultant secondary battery was calculated from the aforementioned equation (II), Y was found to be 0.860 meq/Ah.

Comparative Example 11

A nickel-hydrogen secondary battery was manufactured by repeating the same procedures as employed in Example 19 except that the potassium ion exchange capacity $Y_0$ of the separator as measured by means of a titration method was 0.200 meq/g and the weight "W" of the separator was 0.550 g. When the ion exchange capacity "Y" of the separator per 1 Ah of battery capacity of the resultant secondary battery was calculated from the aforementioned equation (II), Y was found to be 0.100 meq/Ah.

Comparative Example 12

A nickel-hydrogen secondary battery was manufactured by repeating the same procedures as employed in Example 19 except that the potassium ion exchange capacity $Y_0$ of the separator as measured by means of a titration method was 0.400 meq/g and the weight "W" of the separator was 0.468 g. When the ion exchange capacity "Y" of the separator per 1 Ah of battery capacity of the resultant secondary battery was calculated from the aforementioned equation (II), Y was found to be 0.170 meq/Ah.

Comparative Example 13

A nickel-hydrogen secondary battery was manufactured by repeating the same procedures as employed in Example 19 except that the potassium ion exchange capacity $Y_0$ of the separator as measured by means of a titration method was 2.50 meq/g and the weight "W" of the separator was 0.506 g. When the ion exchange capacity "Y" of the separator per 1 Ah of battery capacity of the resultant secondary battery was calculated from the aforementioned equation (II), Y was found to be 1.15 meq/Ah.

Comparative Example 14

A nickel-hydrogen secondary battery was manufactured by repeating the same procedures as employed in Example 19 except that the potassium ion exchange capacity $Y_0$ of the separator as measured by means of a titration method was 3.10 meq/g and the weight "W" of the separator was 0.500 g. When the ion exchange capacity "Y" of the separator per 1 Ah of battery capacity of the resultant secondary battery was calculated from the aforementioned equation (II), Y was found to be 1.41 meq/Ah.

These secondary batteries obtained in Examples 19 to 21 and Comparative Examples 11 to 14 were subjected to the charging/discharging cycle test in the same manner as mentioned above to calculate the charge/discharge cycle life of the batteries. The results are shown in Table 5.

As seen from Table 5, the charge/discharge cycle life of the secondary batteries according to Examples of 19 to 21 where the ion-exchange capacity "Y" of any of the separators was controlled to fall within the range of 0.264 to 0.925 (meq/Ah) was found longer than that of the secondary battery according to Comparative Examples 11 to 14.

Comparative Example 15

A nonwoven fabric of the same kind as employed in Example 1 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 50.7 g/m², the weight "W" of the separator being 0.550 g. The separator thus obtained was measured by a titration method to find out the potassium ion exchange capacity $Y_0$ as being 0.200 meq/g.

This separator was then interposed between the negative electrode and the positive electrode in the same manner as in Example 1, and the resultant composite sheet was spirally wound to form an electrode assembly. Then, this electrode assembly and 2.30 ml of an alkaline electrolyte having a normality of 4.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0$=4.00N; V=2.30 ml; and $C_0$=1.10 Ah), X was found to be 8.40. This value of X was then introduced into the aforementioned equation (1): $\{0.409-(X/55)\} Y \leq \{0.636+(2X/55)\}$ to obtain the following equation (f):

$$0.256 \leq Y \leq 0.941 \quad (f)$$

On the other hand, when the ion exchange capacity "Y" of the separator per 1 Ah of battery capacity was calculated from the aforementioned equation (II): $Y=(Y_0 \times W)/C_0$ ($Y_0$=0.200 meq/g; W=0.550 g; and $C_0$=1.10 Ah), Y was found to be 0.100 meq/Ah.

Comparative Example 16

A nickel-hydrogen secondary battery was manufactured by repeating the same procedures as employed in Comparative Example 15 except that the potassium ion exchange capacity $Y_0$ of the separator as measured by means of a titration method was 0.400 meq/g and the weight "W" of the separator was 0.523 g. When the ion exchange capacity "Y" of the separator per 1 Ah of battery capacity of the resultant secondary battery was calculated from the aforementioned equation (II), Y was found to be 0.190 meq/Ah.

Comparative Example 17

A nickel-hydrogen secondary battery was manufactured by repeating the same procedures as employed in Comparative Example 15 except that the potassium ion exchange capacity $Y_0$ of the separator as measured by means of a titration method was 0.800 meq/g and the weight "W" of the separator was 0.495 g. When the ion exchange capacity "Y" of the separator per 1 Ah of battery capacity of the resultant secondary battery was calculated from the aforementioned equation (II), Y was found to be 0.360 meq/Ah.

Comparative Example 18

A nickel-hydrogen secondary battery was manufactured by repeating the same procedures as employed in Comparative Example 15 except that the potassium ion exchange capacity $Y_0$ of the separator as measured by means of a titration method was 1.50 meq/g and the weight "W" of the separator was 0.506 g. When the ion exchange capacity "Y" of the separator per 1 Ah of battery capacity of the resultant secondary battery was calculated from the aforementioned equation (II), Y was found to be 0.690 meq/Ah.

Comparative Example 19

A nickel-hydrogen secondary battery was a manufactured by repeating the same procedures as employed in Comparative Example 15 except that the potassium ion exchange capacity $Y_0$ of the separator as measured by means of a titration method was 190 meq/g and the weight "W" of the separator was 0.504 g. When the ion exchange capacity "Y" of the separator per 1 Ah of battery capacity of the resultant secondary battery was calculated from the aforementioned equation (II), Y was found to be 0.870 meq/Ah.

Comparative Example 20

A nickel-hydrogen secondary battery was manufactured by repeating the same procedures as employed in Comparative Example 15 except that the potassium ion exchange capacity $Y_0$ of the separator as measured by means of a titration method was 2.50 meq/g and the weight "W" of the separator was 0.502 g. When the ion exchange capacity "Y" of the separator per 1 Ah of battery capacity of the resultant secondary battery was calculated from the aforementioned equation (II), Y was found to be 1.14 meq/Ah.

Comparative Example 21

A nickel-hydrogen secondary battery was manufactured by repeating the same procedures as employed in Comparative Example 15 except that the potassium ion exchange capacity $Y_0$ of the separator as measured by means of a titration method was 3.10 meq/g and the weight "W" of the separator was 0.500 g. When the ion exchange capacity "Y" of the separator per 1 Ah of battery capacity of the resultant secondary battery was calculated from the aforementioned equation (II), Y was found to be 1.41 meq/Ah.

These secondary batteries obtained in Comparative Examples 15 to 21 were subjected to the charging/discharging cycle test in the same manner as mentioned above to calculate the charge/discharge cycle life of the batteries. The results are shown in Table 6.

As seen from Table 6, the secondary batteries according to Comparative Examples of 15 to 21 were all inferior in charge/discharge cycle life.

TABLE 1

(Separator: Average fiber diameter = 1 μm)

| | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Example 1 | 9.00 | 18.8 | 0.100 | 0.067 | 1.32 | 490 |
| Example 2 | 9.00 | 18.8 | 0.190 | 0.067 | 1.32 | 534 |
| Example 3 | 9.00 | 18.8 | 0.360 | 0.067 | 1.32 | 568 |
| Example 4 | 9.00 | 18.8 | 0.680 | 0.067 | 1.32 | 550 |
| Example 5 | 9.00 | 18.8 | 0.850 | 0.067 | 1.32 | 543 |
| Example 6 | 9.00 | 18.8 | 1.15 | 0.067 | 1.32 | 531 |
| Comparative Example 1 | 9.00 | 18.8 | 1.41 | 0.067 | 1.32 | 432 |

TABLE 2

(Separator: Average fiber diameter = 1 μm)

| | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Comparative Example 2 | 7.00 | 14.6 | 0.110 | 0.143 | 1.17 | 395 |
| Example 7 | 7.00 | 14.6 | 0.190 | 0.143 | 1.17 | 503 |

TABLE 2-continued (Separator: Average fiber diameter = 1 μm)

|  | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Example 8 | 7.00 | 14.6 | 0.370 | 0.143 | 1.17 | 549 |
| Example 9 | 7.00 | 14.6 | 0.690 | 0.143 | 1.17 | 545 |
| Example 10 | 7.00 | 14.6 | 0.860 | 0.143 | 1.17 | 532 |
| Example 11 | 7.00 | 14.6 | 1.14 | 0.143 | 1.17 | 490 |
| Comparative Example 3 | 7.00 | 14.6 | 1.41 | 0.143 | 1.17 | 406 |

TABLE 3

(Separator: Average fiber diameter = 1 μm)

|  | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Comparative Example 4 | 7.00 | 12.7 | 0.100 | 0.178 | 1.10 | 270 |
| Example 12 | 7.00 | 12.7 | 0.180 | 0.178 | 1.10 | 375 |
| Example 13 | 7.00 | 12.7 | 0.370 | 0.178 | 1.10 | 398 |
| Example 14 | 7.00 | 12.7 | 0.690 | 0.178 | 1.10 | 405 |
| Example 15 | 7.00 | 12.7 | 0.870 | 0.178 | 1.10 | 391 |
| Comparative Example 5 | 7.00 | 12.7 | 1.15 | 0.178 | 1.10 | 331 |
| Comparative Example 6 | 7.00 | 12.7 | 1.42 | 0.178 | 1.10 | 268 |

TABLE 4

(Separator: Average fiber diameter = 1 μm)

|  | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Comparative Example 7 | 5.00 | 10.5 | 0.100 | 0.218 | 1.02 | 338 |
| Comparative Example 8 | 5.00 | 10.5 | 0.190 | 0.218 | 1.02 | 401 |
| Example 16 | 5.00 | 10.5 | 0.360 | 0.218 | 1.02 | 509 |
| Example 17 | 5.00 | 10.5 | 0.680 | 0.218 | 1.02 | 556 |
| Example 18 | 5.00 | 10.5 | 0.860 | 0.218 | 1.02 | 522 |
| Comparative Example 9 | 5.00 | 10.5 | 1.15 | 0.218 | 1.02 | 436 |
| Comparative Example 10 | 5.00 | 10.5 | 1.41 | 0.218 | 1.02 | 354 |

TABLE 5

(Separator: Average fiber diameter = 1 μm)

|  | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Comparative Example 11 | 5.00 | 7.95 | 0.100 | 0.264 | 0.925 | 238 |
| Comparative Example 12 | 5.00 | 7.95 | 0.170 | 0.264 | 0.925 | 300 |
| Example 19 | 5.00 | 7.95 | 0.360 | 0.264 | 0.925 | 368 |
| Example 20 | 5.00 | 7.95 | 0.700 | 0.264 | 0.925 | 384 |
| Example 21 | 5.00 | 7.95 | 0.860 | 0.264 | 0.925 | 360 |

TABLE 5-continued (Separator: Average fiber diameter = 1 μm)

|  | Normality of electrolyte (N) | Equivalent amount "X" of electrolyte (meq/Ah) | Ion-exchange capacity "Y" (meq/Ah) | $0.409 - (X/55)$ (meq/Ah) | $0.636 + (2X/55)$ (meq/Ah) | Cycle life |
|---|---|---|---|---|---|---|
| Comparative Example 13 | 5.00 | 7.95 | 1.15 | 0.264 | 0.925 | 247 |
| Comparative Example 14 | 5.00 | 7.95 | 1.41 | 0.264 | 0.925 | 212 |

TABLE 6

(Separator: Average fiber diameter = 1 μm)

|  | Normality of electrolyte (N) | Equivalent amount "X" of electrolyte (meq/Ah) | Ion-exchange capacity "Y" (meq/Ah) | $0.409 - (X/55)$ (meq/Ah) | $0.636 + (2X/55)$ (meq/Ah) | Cycle life |
|---|---|---|---|---|---|---|
| Comparative Example 15 | 4.00 | 8.40 | 0.100 | 0.256 | 0.941 | 303 |
| Comparative Example 16 | 4.00 | 8.40 | 0.190 | 0.256 | 0.941 | 326 |
| Comparative Example 17 | 4.00 | 8.40 | 0.360 | 0.256 | 0.941 | 349 |
| Comparative Example 18 | 4.00 | 8.40 | 0.690 | 0.256 | 0.941 | 316 |
| Comparative Example 19 | 4.00 | 8.40 | 0.870 | 0.256 | 0.941 | 324 |
| Comparative Example 20 | 4.00 | 8.40 | 1.14 | 0.256 | 0.941 | 314 |
| Comparative Example 21 | 4.00 | 8.40 | 1.41 | 0.256 | 0.941 | 280 |

Figure 3:
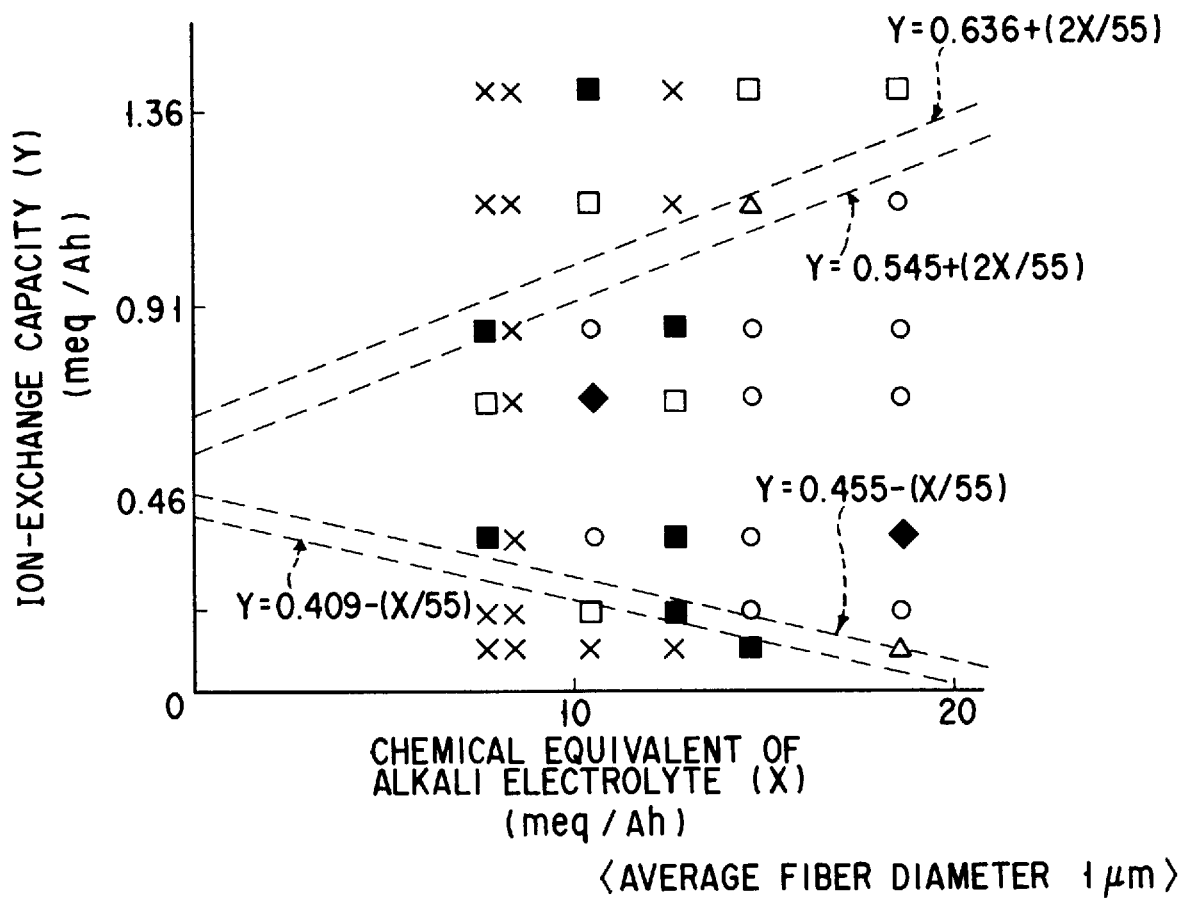
FIG. 3 is a graph showing the relationship among the ion-exchange capacity "Y", chemical equivalent of alkaline electrolyte "X" and the cycle life in the nickel-hydrogen secondary batteries in Examples 1 to 21 of this invention and Comparative Examples 1 to 21.

The charge/discharge cycle lives thus obtained in Examples 1 to 21 are illustrated in the coordinates shown in FIG. 3 wherein the ion-exchange capacity Y (meq/Ah) of the separator per 1 Ah of battery capacity is indicated by the axis of ordinate indicate, while the chemical equivalent of alkaline electrolyte X (meq/Ah) per 1 Ah of battery capacity is indicated by the axis of abscissa.

As apparent from FIG. 3, in the case of a nickel-hydrogen secondary battery provided with a separator containing polyolefin-based fibers having an ion-exchange group and with alkaline electrolyte having a normality of 5 or more in concentration, the nickel-hydrogen secondary battery wherein the ion-exchange capacity Y (meq/Ah) of the separator per 1 Ah of battery capacity satisfied the aforementioned equation (1): $\{0.409-(X/55)\} \leq Y \leq \{0.636+(2X/55)\}$ indicated a longer charge/discharge cycle life as compared with the nickel-hydrogen secondary battery wherein the aforementioned ion-exchange capacity Y (meq/Ah) fell outside the range defined by the aforementioned equation (1).

Whereas, in the case of Comparative Examples 15 to 21 provided with an alkaline electrolyte having a normality of 4.00 in concentration, the charge/discharge cycle life thereof was found relatively short even if the aforementioned ion-exchange capacity Y (meq/Ah) satisfied the aforementioned equation (1). This fact can be ascribed to the low conductivity of the alkaline electrolyte having the aforementioned concentration.

EXAMPLE 22

A nonwoven fabric consisting of long fiber 10 μm in average fiber diameter and having a weight per unit area of 50 g/m² and a thickness of 0.20 mm was prepared from polypropylene resin according to a spun bond method. Then, by making use of an apparatus comprising a pair of parallel rolls, i.e. a first roll having a smooth surface and a second roll having a plurality of pinpoint-shaped projections, each adapted to be rotated in a direction opposite to each other and heated to 130° C., the nonwoven fabric was forced to pass through the space between these rolls to be pressed and thermally fused, thereby forming an emboss pattern. The areal ratio of this fused portion was limited to 16% based on one main surface of the nonwoven fabric. Thereafter, the nonwoven fabric was dipped into an aqueous solution of acrylic acid, and then exposed to the irradiation of ultraviolet rays thereby graft-polymerizing the acrylic acid monomer. The resultant nonwoven fabric was washed to remove unreacted acrylic acid, and then dried thereby obtaining a separator formed of a nonwoven fabric comprising polypropylene fibers having carboxyl group as an ion-exchange group and polypropylene fibers having nothing of ion-exchange group, the weight per unit area of the separator being 51.0 g/m², the weight "W" of the separator being 0.513 g. The potassium ion exchange capacity $Y_0$ of this separator was found to be 0.300 meq/g as measured by a titration method.

This separator was then interposed between the negative electrode and the positive electrode in the same manner as in Example 1, and the resultant composite sheet was spirally wound to form an electrode assembly. Then, this electrode assembly and 2.30 ml of an alkaline electrolyte having a normality of 9.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0=9.00$N; V=2.30 ml; and $C_0=1.10$ Ah), X was found to be 18.8. This value of X was then introduced into the aforementioned equation (1): $\{0.409-(X/55)\} \leq Y \leq \{0.636+(2X/55)\}$ to obtain the following equation (A):

$$0.067 \leq Y \leq 1.32 \tag{A}$$

On the other hand, when the ion exchange capacity "Y" of the separator per 1 Ah of battery capacity was calculated from the aforementioned equation (II): $Y=(Y_0 \times W)/C_0$ ($Y_0=0.300$ meq/g; W=0.513 g; and $C_0=1.10$ Ah), Y was found to be 0.140 meq/Ah.

EXAMPLE 23

A nickel-hydrogen secondary battery was manufactured by repeating the same procedures as employed in Example 22 except that the potassium ion exchange capacity $Y_0$ of the separator as measured by means of a titration method was 0.400 meq/g and the weight "W" of the separator was 0.495 g. When the ion exchange capacity "Y" of the separator per 1 Ah of battery capacity of the resultant secondary battery was calculated from the aforementioned equation (II), Y was found to be 0.180 meq/Ah.

EXAMPLE 24

A nickel-hydrogen secondary battery was manufactured by repeating the same procedures as employed in Example 22 except that the potassium ion exchange capacity $Y_0$ of the separator as measured by means of a titration method was 0.600 meq/g and the weight "W" of the separator was 0.513 g. When the ion exchange capacity "Y" of the separator per 1 Ah of battery capacity of the resultant secondary battery was calculated from the aforementioned equation (II), Y was found to be 0.280 meq/Ah.

EXAMPLE 25

A nickel-hydrogen secondary battery was manufactured by repeating the same procedures as employed in Example 22 except that the potassium ion exchange capacity $Y_0$ of the separator as measured by means of a titration method was 1.00 meq/g and the weight "W" of the separator was 0.506 g. When the ion exchange capacity "Y" of the separator per 1 Ah of battery capacity of the resultant secondary battery was calculated from the aforementioned equation (II), Y was found to be 0.460 meq/Ah.

EXAMPLE 26

A nickel-hydrogen secondary battery was manufactured by repeating the same procedures as employed in Example 22 except that the potassium ion exchange capacity $Y_0$ of the separator as measured by means of a titration method was 2.00 meq/g and the weight "W" of the separator was 0.506 g. When the ion exchange capacity "Y" of the separator per 1 Ah of battery capacity of the resultant secondary battery was calculated from the aforementioned equation (II), Y was found to be 0.920 meq/Ah.

EXAMPLE 27

A nickel-hydrogen secondary battery was manufactured by repeating the same procedures as employed in Example 22 except that the potassium ion exchange capacity $Y_0$ of the separator as measured by means of a titration method was 2.40 meq/g and the weight "W" of the separator was 0.509 g. When the ion exchange capacity "Y" of the separator per 1 Ah of battery capacity of the resultant secondary battery was calculated from the aforementioned equation (II), Y was found to be 1.11 meq/Ah.

Comparative Example 22

A nickel-hydrogen secondary battery was manufactured by repeating the same procedures as employed in Example 22 except that the potassium ion exchange capacity $Y_0$ of the separator as measured by means of a titration method was 3.00 meq/g and the weight "W" of the separator was 0.502 g. When the ion exchange capacity "Y" of the separator per 1 Ah of battery capacity of the resultant secondary battery was calculated from the aforementioned equation (II), Y was found to be 1.37 meq/Ah.

These secondary batteries obtained in Examples 22 to 27 and Comparative Example 22 were subjected to the charging/discharging cycle test in the same manner as mentioned above to calculate the charge/discharge cycle life of the batteries. The results are shown in Table 7.

As seen from Table 7, the charge/discharge cycle life of the secondary batteries according to Examples of 22 to 27 where the ion-exchange capacity "Y" of any of the separators was controlled to fall within the range of 0.067 to 1.32 (meq/Ah) was found longer than that of the secondary battery according to Comparative Example 22.

EXAMPLE 28

A nonwoven fabric of the same kind as employed in Example 22 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 51.5 g/m$^2$, the weight "W" of the separator being 0.495 g. The potassium ion exchange capacity $Y_0$ of this separator was found to be 0.400 meq/g as measured by a titration method.

This separator was then interposed between the negative electrode and the positive electrode in the same manner as in Example 1, and the resultant composite sheet was spirally wound to form an electrode assembly. Then, this electrode assembly and 2.30 ml of an alkaline electrolyte having a normality of 7.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0=7.00$N; V=2.30 ml; and $C_0=1.10$ Ah), X was found to be 14.6. This value of X was then introduced into the aforementioned equation (1): $\{0.409-(X/55)\} \leq Y \leq \{0.636+(2X/55)\}$ to obtain the following equation (B):

$$0.143 \leq Y \leq 1.17 \tag{B}$$

On the other hand, when the ion exchange capacity "Y" of the separator per 1 Ah of battery capacity was calculated from the aforementioned equation (II): $Y=(Y_0 \times W)/C_0$ ($Y_0$= 0.400 meq/g; W=0.495 g; and $C_0$=1.10 Ah), Y was found to be 0.180 meq/Ah.

EXAMPLE 29

A nickel-hydrogen secondary battery was manufactured by repeating the same procedures as employed in Example 28 except that the potassium ion exchange capacity $Y_0$ of the separator as measured by means of a titration method was 0.600 meq/g and the weight "W" of the separator was 0.513 g. When the ion exchange capacity "Y" of the separator per 1 Ah of battery capacity of the resultant secondary battery was calculated from the aforementioned equation (II), Y was found to be 0.280 meq/Ah.

EXAMPLE 30

A nickel-hydrogen secondary battery was manufactured by repeating the same procedures as employed in Example 28 except that the potassium ion exchange capacity $Y_0$ of the separator as measured by means of a titration method was 1.00 meq/g and the weight "W" of the separator was 0.495 g. When the ion exchange capacity "Y" of the separator per 1 Ah of battery capacity of the resultant secondary battery was calculated from the aforementioned equation (II), Y was found to be 0.450 meq/Ah.

EXAMPLE 31

A nickel-hydrogen secondary battery was manufactured by repeating the same procedures as employed in Example 28 except that the potassium ion exchange capacity $Y_0$ of the separator as measured by means of a titration method was 2.00 meq/g and the weight "W" of the separator was 0.501 g. When the ion exchange capacity "Y" of the separator per 1 Ah of battery capacity of the resultant secondary battery was calculated from the aforementioned equation (II), Y was found to be 0.910 meq/Ah.

EXAMPLE 32

A nickel-hydrogen secondary battery was manufactured by repeating the same procedures as employed in Example 28 except that the potassium ion exchange capacity $Y_0$ of the separator as measured by means of a titration method was 2.40 meq/g and the weight "W" of the separator was 0.504 g. When the ion exchange capacity "Y" of the separator per 1 Ah of battery capacity of the resultant secondary battery was calculated from the aforementioned equation (II), Y was found to be 1.10 meq/Ah.

Comparative Example 23

A nickel-hydrogen secondary battery was manufactured by repeating the same procedures as employed in Example 28 except that the potassium ion exchange capacity $Y_0$ of the separator as measured by means of a titration method was 0.300 meq/g and the weight "W" of the separator was 0.513 g. When the ion exchange capacity "Y" of the separator per 1 Ah of battery capacity of the resultant secondary battery was calculated from the aforementioned equation (II), Y was found to be 0.140 meq/Ah.

Comparative Example 24

A nickel-hydrogen secondary battery was manufactured by repeating the same procedures as employed in Example 28 except that the potassium ion exchange capacity $Y_0$ of the separator as measured by means of a titration method was 3.00 meq/g and the weight "W" of the separator was 0.502 g. When the ion exchange capacity "Y" of the separator per 1 Ah of battery capacity of the resultant secondary battery was calculated from the aforementioned equation (II), Y was found to be 1.37 meq/Ah.

These secondary batteries obtained in Examples 28 to 32 and Comparative Examples 23 and 24 were subjected to the charging/discharging cycle test in the same manner as mentioned above to calculate the charge/discharge cycle life of the batteries. The results are shown in Table 8.

As seen from Table 8, the charge/discharge cycle life of the secondary batteries according to Examples of 28 to 32 where the ion-exchange capacity "Y" of any of the separators was controlled to fall within the range of 0.143 to 1.17 (meq/Ah) was found longer than that of the secondary battery according to Comparative Examples 23 and 24.

EXAMPLE 33

A nonwoven fabric of the same kind as employed in Example 22 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 52.1 g/m$^2$, the weight "W" of the separator being 0.513 g. The potassium ion exchange capacity $Y_0$ of this separator was found to be 0.600 meq/g as measured by a titration method.

This separator was then interposed between the negative electrode and the positive electrode in the same manner as in Example 1, and the resultant composite sheet was spirally wound to form an electrode assembly. Then, this electrode assembly and 2.30 ml of an alkaline electrolyte having a normality of 5.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0$=5.00N; V=2.30 ml; and $C_0$=1.10 Ah), X was found to be 10.5. This value of X was then introduced into the aforementioned equation (1): $\{0.409-(X/55)\} \leq Y \leq \{0.636+(2X/55)\}$ to obtain the following equation (C):

$$0.218 \leq Y \leq 1.02 \qquad (C)$$

On the other hand, when the ion exchange capacity "Y" of the separator per 1 Ah of battery capacity was calculated from the aforementioned equation (II): $Y=(Y_0 \times W)/C_0$ ($Y_0$= 0.600 meq/g; W=0.513 g; and $C_0$=1.10 Ah), Y was found to be 0.280 meq/Ah.

EXAMPLE 34

A nickel-hydrogen secondary battery was manufactured by repeating the same procedures as employed in Example 33 except that the potassium ion exchange capacity $Y_0$ of the separator as measured by means of a titration method was 1.00 meq/g and the weight "W" of the separator was 0.506 g. When the ion exchange capacity "Y" of the separator per 1 Ah of battery capacity of the resultant secondary battery was calculated from the aforementioned equation (II), Y was found to be 0.460 meq/Ah.

EXAMPLE 35

A nickel-hydrogen secondary battery was manufactured by repeating the same procedures as employed in Example 33 except that the potassium ion exchange capacity $Y_0$ of the separator as measured by means of a titration method was 2.00 meq/g and the weight "W" of the separator was 0.506 g. When the ion exchange capacity "Y" of the separator per 1 Ah of battery capacity of the resultant secondary battery was calculated from the aforementioned equation (II), Y was found to be 0.920 meq/Ah.

Comparative Example 25

A nickel-hydrogen secondary battery was manufactured by repeating the same procedures as employed in Example 33 except that the potassium ion exchange capacity $Y_0$ of the separator as measured by means of a titration method was 0.300 meq/g and the weight "W" of the separator was 0.550 g. When the ion exchange capacity "Y" of the separator per 1 Ah of battery capacity of the resultant secondary battery was calculated from the aforementioned equation (II), Y was found to be 0.150 meq/Ah.

Comparative Example 26

A nickel-hydrogen secondary battery was manufactured by repeating the same procedures as employed in Example 33 except that the potassium ion exchange capacity $Y_0$ of the separator as measured by means of a titration method was 0.400 meq/g and the weight "W" of the separator was 0.523 g. When the ion exchange capacity "Y" of the separator per 1 Ah of battery capacity of the resultant secondary battery was calculated from the aforementioned equation (II), Y was found to be 0.190 meq/Ah.

Comparative Example 27

A nickel-hydrogen secondary battery was manufactured by repeating the same procedures as employed in Example 33 except that the potassium ion exchange capacity $Y_0$ of the separator as measured by means of a titration method was 2.40 meq/g and the weight "W" of the separator was 0.509 g. When the ion exchange capacity "Y" of the separator per 1 Ah of battery capacity of the resultant secondary battery was calculated from the aforementioned equation (II), Y was found to be 1.11 meq/Ah.

Comparative Example 28

A nickel-hydrogen secondary battery was manufactured by repeating the same procedures as employed in Example 33 except that the potassium ion exchange capacity $Y_0$ of the separator as measured by means of a titration method was 3.00 meq/g and the weight "W" of the separator was 0.499 g. When the ion exchange capacity "Y" of the separator per 1 Ah of battery capacity of the resultant secondary battery was calculated from the aforementioned equation (II), Y was found to be 1.36 meq/Ah.

These secondary batteries obtained in Examples 33 to 35 and Comparative Examples 25 to 28 were subjected to the charging/discharging cycle test in the same manner as mentioned above to calculate the charge/discharge cycle life of the batteries. The results are shown in Table 9.

As seen from Table 9, the charge/discharge cycle life of the secondary batteries according to Examples of 33 to 35 where the ion-exchange capacity "Y" of any of the separators was controlled to fall within the range of 0.218 to 1.02 (meq/Ah) was found longer than that of the secondary battery according to Comparative Examples 25 to 28.

EXAMPLE 36

A nonwoven fabric of the same kind as employed in Example 22 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 52.8 g/m², the weight "W" of the separator being 0.495 g. The potassium ion exchange capacity $Y_0$ of this separator was found to be 0.800 meq/g as measured by a titration method.

This separator was then interposed between the negative electrode and the positive electrode in the same manner as in Example 1, and the resultant composite sheet was spirally wound to form an electrode assembly. Then, this electrode assembly and 1.75 ml of an alkaline electrolyte having a normality of 5.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0$=5.00N; V=1.75 ml; and $C_0$=1.10 Ah), X was found to be 7.95. This value of X was then introduced into the aforementioned equation (1): $\{0.409-(X/55)\} \leq Y \leq \{0.636+(2X/55)\}$ to obtain the following equation (D):

$$0.264 \leq Y \leq 0.925 \qquad (D)$$

On the other hand, when the ion exchange capacity "Y" of the separator per 1 Ah of battery capacity was calculated from the aforementioned equation (II): $Y=(Y_0 \times W)/C_0$ ($Y_0$=0.800 meq/g; W=0.495 g; and $C_0$=1.10 Ah), Y was found to be 0.360 meq/Ah.

EXAMPLE 37

A nickel-hydrogen secondary battery was manufactured by repeating the same procedures as employed in Example 36 except that the potassium ion exchange capacity $Y_0$ of the separator as measured by means of a titration method was 1.50 meq/g and the weight "W" of the separator was 0.513 g. When the ion exchange capacity "Y" of the separator per 1 Ah of battery capacity of the resultant secondary battery was calculated from the aforementioned equation (II), Y was found to be 0.700 meq/Ah.

EXAMPLE 38

A nickel-hydrogen secondary battery was manufactured by repeating the same procedures as employed in Example 36 except that the potassium ion exchange capacity $Y_0$ of the separator as measured by means of a titration method was 190 meq/g and the weight "W" of the separator was 0.498 g. When the ion exchange capacity "Y" of the separator per 1 Ah of battery capacity of the resultant secondary battery was calculated from the aforementioned equation (II), Y was found to be 0.860 meq/Ah.

Comparative Example 29

A nickel-hydrogen secondary battery was manufactured by repeating the same procedures as employed in Example 36 except that the potassium ion exchange capacity $Y_0$ of the separator as measured by means of a titration method was 0.200 meq/g and the weight "W" of the separator was 0.550 g. When the ion exchange capacity "Y" of the separator per 1 Ah of battery capacity of the resultant secondary battery was calculated from the aforementioned equation (II), Y was found to be 0.100 meq/Ah.

Comparative Example 30

A nickel-hydrogen secondary battery was manufactured by repeating the same procedures as employed in Example 36 except that the potassium ion exchange capacity $Y_0$ of the separator as measured by means of a titration method was 0.400 meq/g and the weight "W" of the separator was 0.468 g. When the ion exchange capacity "Y" of the separator per 1 Ah of battery capacity of the resultant secondary battery was calculated from the aforementioned equation (II), Y was found to be 0.170 meq/Ah.

Comparative Example 31

A nickel-hydrogen secondary battery was manufactured by repeating the same procedures as employed in Example 36 except that the potassium ion exchange capacity $Y_0$ of the separator as measured by means of a titration method was 2.50 meq/g and the weight "W" of the separator was 0.506 g. When the ion exchange capacity "Y" of the separator per 1 Ah of battery capacity of the resultant secondary battery was calculated from the aforementioned equation (II), Y was found to be 1.15 meq/Ah.

Comparative Example 32

A nickel-hydrogen secondary battery was manufactured by repeating the same procedures as employed in Example 36 except that the potassium ion exchange capacity $Y_0$ of the separator as measured by means of a titration method was 3.10 meq/g and the weight "W" of the separator was 0.500 g. When the ion exchange capacity "Y" of the separator per 1 Ah of battery capacity of the resultant secondary battery was calculated from the aforementioned equation (II), Y was found to be 1.41 meq/Ah.

These secondary batteries obtained in Examples 36 to 38 and Comparative Examples 29 to 32 were subjected to the charging/discharging cycle test in the same manner as mentioned above to calculate the charge/discharge cycle life of the batteries. The results are shown in Table 10.

As seen from Table 10, the charge/discharge cycle life of the secondary batteries according to Examples of 36 to 38 where the ion-exchange capacity "Y" of any of the separators was controlled to fall within the range of 0.264 to 0.925 (meq/Ah) was found longer than that of the secondary battery according to Comparative Examples 29 to 32.

Comparative Example 33

A nonwoven fabric of the same kind as employed in Example 22 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 51.0 g/m², the weight "W" of the separator being 0.513 g. The potassium ion exchange capacity $Y_0$ of this separator was found to be 0.300 meq/g as measured by a titration method.

This separator was then interposed between the negative electrode and the positive electrode in the same manner as in Example 1, and the resultant composite sheet was spirally wound to form an electrode assembly. Then, this electrode assembly and 2.30 ml of an alkaline electrolyte having a normality of 4.00 and comprising KOH and LiOH (molar ratio=17:1) were accommodated in the bottomed cylindrical vessel to manufacture a cylindrical nickel-hydrogen secondary battery of AA size as shown in FIG. 1. The capacity (nominal capacity) "$C_0$" of the battery was 1.10 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0$=4.00N; V=2.30 ml; and $C_0$=1.10 Ah), X was found to be 8.40. This value of X was then introduced into the aforementioned equation (1): $\{0.409-(X/55)\} \leq Y \leq \{0.636+(2X/55)\}$ to obtain the following equation (E):

$$0.256 \leq Y \leq 0.941 \quad (E)$$

On the other hand, when the ion exchange capacity "Y" of the separator per 1 Ah of battery capacity was calculated from the aforementioned equation (II): $Y=(Y_0 \times W)/C_0$ ($Y_0$=0.300 meq/g; W=0.513 g; and $C_0$=1.10 Ah), Y was found to be 0.140 meq/Ah.

Comparative Example 34

A nickel-hydrogen secondary battery was manufactured by repeating the same procedures as employed in Comparative Example 33 except that the potassium ion exchange capacity $Y_0$ of the separator as measured by means of a titration method was 0.400 meq/g and the weight "W" of the separator was 0.495 g. When the ion exchange capacity "Y" of the separator per 1 Ah of battery capacity of the resultant secondary battery was calculated from the aforementioned equation (II), Y was found to be 0.180 meq/Ah.

Comparative Example 35

A nickel-hydrogen secondary battery was manufactured by repeating the same procedures as employed in Comparative Example 33 except that the potassium ion exchange capacity $Y_0$ of the separator as measured by means of a titration method was 0.600 meq/g and the weight "W" of the separator was 0.495 g. When the ion exchange capacity "Y" of the separator per 1 Ah of battery capacity of the resultant secondary battery was calculated from the aforementioned equation (II), Y was found to be 0.270 meq/Ah.

Comparative Example 36

A nickel-hydrogen secondary battery was manufactured by repeating the same procedures as employed in Comparative Example 33 except that the potassium ion exchange capacity $Y_0$ of the separator as measured by means of a titration method was 1.00 meq/g and the weight "W" of the separator was 0.495 g. When the ion exchange capacity "Y" of the separator per 1 Ah of battery capacity of the resultant secondary battery was calculated from the aforementioned equation (II), Y was found to be 0.450 meq/Ah.

Comparative Example 37

A nickel-hydrogen secondary battery was manufactured by repeating the same procedures as employed in Comparative Example 33 except that the potassium ion exchange capacity $Y_0$ of the separator as measured by means of a titration method was 2.00 meq/g and the weight "W" of the separator was 0.506 g. When the ion exchange capacity "Y" of the separator per 1 Ah of battery capacity of the resultant secondary battery was calculated from the aforementioned equation (II), Y was found to be 0.920 meq/Ah.

Comparative Example 38

A nickel-hydrogen secondary battery was manufactured by repeating the same procedures as employed in Comparative Example 33 except that the potassium ion exchange capacity $Y_0$ of the separator as measured by means of a titration method was 2.40 meq/g and the weight "W" of the separator was 0.509 g. When the ion exchange capacity "Y" of the separator per 1 Ah of battery capacity of the resultant secondary battery was calculated from the aforementioned equation (II), Y was found to be 1.11 meq/Ah.

Comparative Example 39

A nickel-hydrogen secondary battery was manufactured by repeating the same procedures as employed in Comparative Example 33 except that the potassium ion exchange capacity $Y_0$ of the separator as measured by means of a titration method was 3.00 meq/g and the weight "W" of the separator was 0.499 g. When the ion exchange capacity "Y" of the separator per 1 Ah of battery capacity of the resultant secondary battery was calculated from the aforementioned equation (II), Y was found to be 1.36 meq/Ah.

These secondary batteries obtained in Comparative Examples 33 to 39 were subjected to the charging/discharging cycle test in the same manner as mentioned above to calculate the charge/discharge cycle life of the batteries. The results are shown in Table 11.

As seen from Table 11, the secondary batteries according to Comparative Examples of 33 to 39 were all inferior in charge/discharge cycle life.

TABLE 7

(Separator: Average fiber diameter = 10 μm)

| | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Example 22 | 9.00 | 18.8 | 0.140 | 0.067 | 1.32 | 436 |
| Example 23 | 9.00 | 18.8 | 0.180 | 0.067 | 1.32 | 445 |
| Example 24 | 9.00 | 18.8 | 0.280 | 0.067 | 1.32 | 467 |
| Example 25 | 9.00 | 18.8 | 0.460 | 0.067 | 1.32 | 440 |
| Example 26 | 9.00 | 18.8 | 0.920 | 0.067 | 1.32 | 432 |
| Example 27 | 9.00 | 18.8 | 1.11 | 0.067 | 1.32 | 430 |
| Comparative Example 22 | 9.00 | 18.8 | 1.37 | 0.067 | 1.32 | 355 |

TABLE 8

(Separator: Average fiber diameter = 10 μm)

| | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Comparative Example 23 | 7.00 | 14.6 | 0.140 | 0.143 | 1.17 | 340 |
| Example 28 | 7.00 | 14.6 | 0.180 | 0.143 | 1.17 | 430 |
| Example 29 | 7.00 | 14.6 | 0.280 | 0.143 | 1.17 | 451 |
| Example 30 | 7.00 | 14.6 | 0.450 | 0.143 | 1.17 | 466 |
| Example 31 | 7.00 | 14.6 | 0.910 | 0.143 | 1.17 | 433 |
| Example 32 | 7.00 | 14.6 | 1.10 | 0.143 | 1.17 | 405 |
| Comparative Example 24 | 7.00 | 14.6 | 1.37 | 0.143 | 1.17 | 341 |

TABLE 9

(Separator: Average fiber diameter = 10 μm)

| | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Comparative Example 25 | 5.00 | 10.5 | 0.150 | 0.218 | 1.02 | 278 |
| Comparative Example 26 | 5.00 | 10.5 | 0.190 | 0.218 | 1.02 | 322 |
| Example 33 | 5.00 | 10.5 | 0.280 | 0.218 | 1.02 | 398 |
| Example 34 | 5.00 | 10.5 | 0.460 | 0.218 | 1.02 | 406 |
| Example 35 | 5.00 | 10.5 | 0.920 | 0.218 | 1.02 | 391 |
| Comparative Example 27 | 5.00 | 10.5 | 1.11 | 0.218 | 1.02 | 308 |
| Comparative Example 28 | 5.00 | 10.5 | 1.36 | 0.218 | 1.02 | 219 |

TABLE 10

(Separator: Average fiber diameter = 10 μm)

| | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Comparative Example 29 | 5.00 | 7.95 | 0.100 | 0.264 | 0.925 | 238 |
| Comparative Example 30 | 5.00 | 7.95 | 0.170 | 0.264 | 0.925 | 285 |
| Example 36 | 5.00 | 7.95 | 0.360 | 0.264 | 0.925 | 359 |
| Example 37 | 5.00 | 7.95 | 0.700 | 0.264 | 0.925 | 390 |
| Example 38 | 5.00 | 7.95 | 0.860 | 0.264 | 0.925 | 355 |
| Comparative Example 31 | 5.00 | 7.95 | 1.15 | 0.264 | 0.925 | 270 |
| Comparative Example 32 | 5.00 | 7.95 | 1.41 | 0.264 | 0.925 | 205 |

TABLE 11

(Separator: Average fiber diameter = 10 μm)

| | Normality of electrolyte (N) | Equivalent amount "X" of electrolyte (meq/Ah) | Ion-exchange capacity "Y" (meq/Ah) | 0.409 − (X/55) (meq/Ah) | 0.636 + (2X/55) (meq/Ah) | Cycle life |
|---|---|---|---|---|---|---|
| Comparative Example 33 | 4.00 | 8.40 | 0.140 | 0.256 | 0.941 | 224 |
| Comparative Example 34 | 4.00 | 8.40 | 0.180 | 0.256 | 0.941 | 259 |
| Comparative Example 35 | 4.00 | 8.40 | 0.270 | 0.256 | 0.941 | 290 |
| Comparative Example 36 | 4.00 | 8.40 | 0.450 | 0.256 | 0.941 | 286 |
| Comparative Example 37 | 4.00 | 8.40 | 0.920 | 0.256 | 0.941 | 230 |
| Comparative Example 38 | 4.00 | 8.40 | 1.11 | 0.256 | 0.941 | 191 |
| Comparative Example 39 | 4.00 | 8.40 | 1.36 | 0.256 | 0.941 | 180 |

Figure 4:
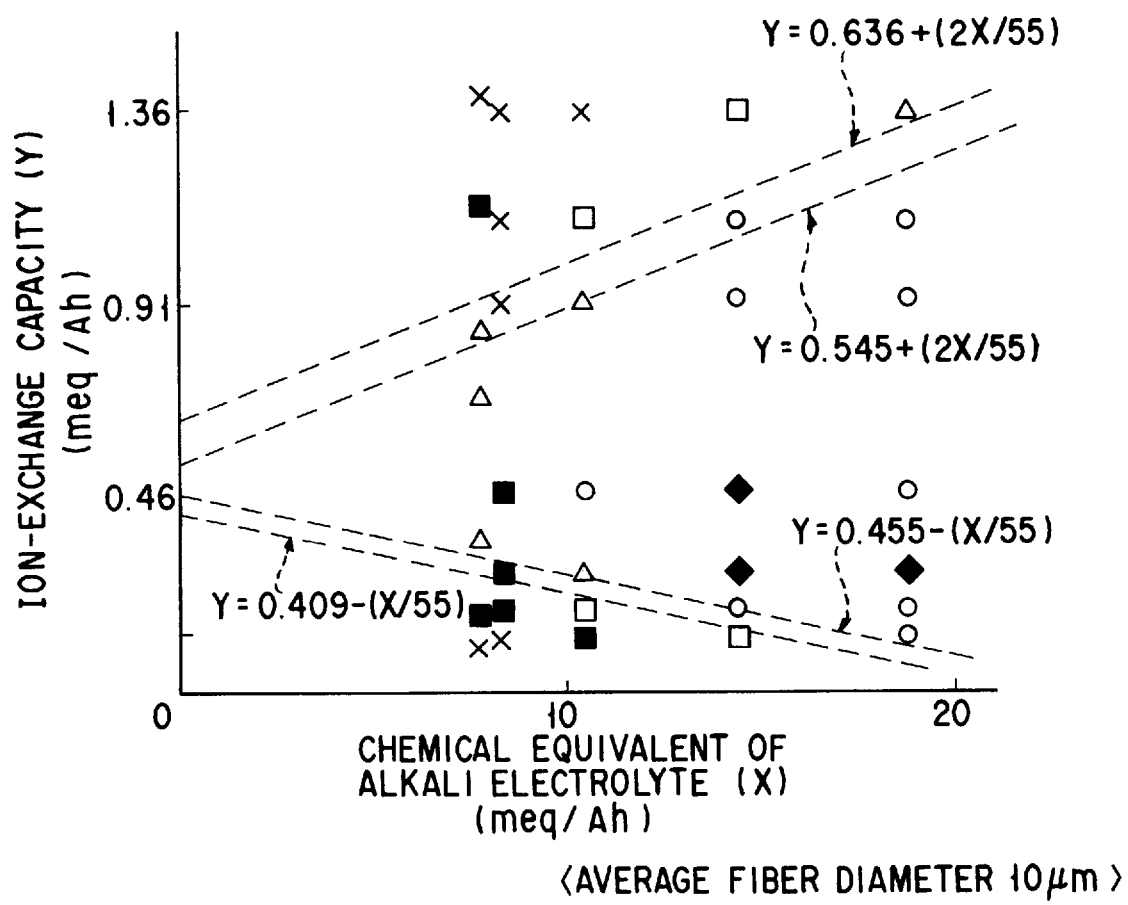
FIG. 4 is a graph showing the relationship among the ion-exchange capacity "Y", chemical equivalent of alkaline electrolyte "X" and the cycle life in the nickel-hydrogen secondary batteries in Examples 22 to 38 of this invention and Comparative Examples 22 to 38.

The charge/discharge cycle lives thus obtained in Examples 22 to 38 are illustrated in the coordinates shown in FIG. 4 wherein the ion-exchange capacity Y (meq/Ah) of the separator per 1 Ah of battery capacity is indicated by the axis of ordinate indicate, while the chemical equivalent of alkaline electrolyte X (meq/Ah) per 1 Ah of battery capacity is indicated by the axis of abscissa.

As apparent from FIG. 4, in the case of a nickel-hydrogen secondary battery provided with a separator containing polyolefin-based fibers having an ion-exchange group and with alkaline electrolyte having a normality of 5 or more in concentration, the nickel-hydrogen secondary battery wherein the ion-exchange capacity Y (meq/Ah) of the separator per 1 Ah of battery capacity satisfied the aforementioned equation (1): $\{0.409-(X/55)\} \leq Y \leq \{0.636+(2X/55)\}$ indicated a longer charge/discharge cycle life as compared with the nickel-hydrogen secondary battery wherein the aforementioned ion-exchange capacity Y (meq/Ah) fell outside the range defined by the aforementioned equation (1).

Whereas, in the case of Comparative Examples 33 to 39 provided with an alkaline electrolyte having a normality of 4.00 in concentration, the charge/discharge cycle life thereof was found relatively short even if the aforementioned ion-exchange capacity Y (meq/Ah) satisfied the aforementioned equation (1). This fact can be ascribed to the low conductivity of the alkaline electrolyte having the aforementioned concentration.

It will be understood from the comparison with respect to the charge/discharge cycle performance between the secondary batteries according to Examples 1 to 21 and the secondary batteries according to Examples 22 to 38 that the charge/discharge cycle life of the secondary battery provided with a separator containing fibers having an average fiber diameter of 1 $\mu$m is longer than that of the secondary battery provided with a separator containing fibers having an average fiber diameter of 10 $\mu$m.

EXAMPLE 39

A nonwoven fabric of the same kind as employed in Example 1 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 52.8 g/m$^2$, the weight "W" of the separator being 0.585 g. The separator thus obtained was measured by a titration method to find out the potassium ion exchange capacity $Y_0$ as being 0.800 meq/g.

This separator was then interposed between the negative electrode and the positive electrode in the same manner as in Example 1, and the resultant composite sheet was spirally wound to form an electrode assembly. Then, this electrode assembly and 2.40 ml of an alkaline electrolyte having a normality of 7.00 and comprising KOH and LiOH (molar ratio=17:1) were accommodated in the bottomed cylindrical vessel to manufacture a cylindrical nickel-hydrogen secondary battery of 4/5A size as shown in FIG. 1. The capacity (nominal capacity) "$C_0$" of the battery was 1.80 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0=7.00N$; $V=2.40$ ml; and $C_0=1.80$ Ah), X was found to be 9.33. This value of X was then introduced into the aforementioned equation (1): $\{0.409-(X/55)\} \leq Y \leq \{0.636+(2X/55)\}$ to obtain the following equation (g):

$$0.239 \leq Y \leq 0.975 \qquad (g)$$

On the other hand, when the ion exchange capacity "Y" of the separator per 1 Ah of battery capacity was calculated from the aforementioned equation (II): $Y=(Y_0 \times W)/C_0$ ($Y_0=0.800$ meq/g; W=0.585 g; and $C_0=1.80$ Ah), Y was found to be 0.260 meq/Ah.

EXAMPLE 40

A nickel-hydrogen secondary battery was manufactured by repeating the same procedures as employed in Example 39 except that the potassium ion exchange capacity $Y_0$ of the separator as measured by means of a titration method was 1.50 meq/g and the weight "W" of the separator was 0.612 g. When the ion exchange capacity "Y" of the separator per 1 Ah of battery capacity of the resultant secondary battery was calculated from the aforementioned equation (II), Y was found to be 0.510 meq/Ah.

EXAMPLE 41

A nickel-hydrogen secondary battery was manufactured by repeating the same procedures as employed in Example 39 except that the potassium ion exchange capacity $Y_0$ of the separator as measured by means of a titration method was 190 meq/g and the weight "W" of the separator was 0.597 g. When the ion exchange capacity "Y" of the separator per 1 Ah of battery capacity of the resultant secondary battery was calculated from the aforementioned equation (II), Y was found to be 0.630 meq/Ah.

EXAMPLE 42

A nickel-hydrogen secondary battery was manufactured by repeating the same procedures as employed in Example 39 except that the potassium ion exchange capacity $Y_0$ of the separator as measured by means of a titration method was 2.50 meq/g and the weight "W" of the separator was 0.612 g. When the ion exchange capacity "Y" of the separator per 1 Ah of battery capacity of the resultant secondary battery was calculated from the aforementioned equation (II), Y was found to be 0.850 meq/Ah.

Comparative Example 40

A nickel-hydrogen secondary battery was manufactured by repeating the same procedures as employed in Example 39 except that the potassium ion exchange capacity $Y_0$ of the separator as measured by means of a titration method was 0.200 meq/g and the weight "W" of the separator was 0.630 g. When the ion exchange capacity "Y" of the separator per 1 Ah of battery capacity of the resultant secondary battery was calculated from the aforementioned equation (II), Y was found to be 0.070 meq/Ah.

Comparative Example 41

A nickel-hydrogen secondary battery was manufactured by repeating the same procedures as employed in Example 39 except that the potassium ion exchange capacity $Y_0$ of the separator as measured by means of a titration method was 0.400 meq/g and the weight "W" of the separator was 0.585 g. When the ion exchange capacity "Y" of the separator per 1 Ah of battery capacity of the resultant secondary battery was calculated from the aforementioned equation (II), Y was found to be 0.130 meq/Ah.

Comparative Example 42

A nickel-hydrogen secondary battery was manufactured by repeating the same procedures as employed in Example 39 except that the potassium ion exchange capacity $Y_0$ of the separator as measured by means of a titration method was 3.10 meq/g and the weight "W" of the separator was 0.592 g. When the ion exchange capacity "Y" of the separator per 1 Ah of battery capacity of the resultant secondary battery was calculated from the aforementioned equation (II), Y was found to be 1.02 meq/Ah.

These secondary batteries obtained in Examples 39 to 42 and Comparative Examples 40 to 42 were subjected to the charging/discharging cycle test in the same manner as mentioned above to calculate the charge/discharge cycle life of the batteries. The results are shown in FIG. 5.

As seen from FIG. 5, the nickel-hydrogen secondary battery according to Examples 39 to 42 wherein the ion-exchange capacity Y (meq/Ah) of the separator per 1 Ah of battery capacity satisfied the aforementioned equation (1): $\{0.409-(X/55)\} \leq Y \leq \{0.636+(2X/55)\}$ indicated a longer charge/discharge cycle life as compared with the nickel-hydrogen secondary battery according to Comparative Examples 40 to 42 wherein the aforementioned ion-exchange capacity Y (meq/Ah) fell outside the range defined by the aforementioned equation (1).

EXAMPLE 43

A nonwoven fabric of the same kind as employed in Example 1 was dipped into an aqueous acrylic acid solution, and then exposed to the irradiation of ultra-violet ray thereby graft-polymerizing the acrylic acid monomer. The resultant nonwoven fabric was washed to remove unreacted acrylic acid, and then dried to obtain a separator formed of a nonwoven fabric comprising polypropylene fibers having carboxyl group as an ion-exchange group and polypropylene fibers having nothing of ion-exchange group, the weight per unit area of the separator being 52.8 $g/m^2{}_1$ the weight "W" of the separator being 0.743 g. The separator thus obtained was measured by a titration method to find out the potassium ion exchange capacity $Y_0$ as being 0.800 meq/g.

This separator was then interposed between the negative electrode and the positive electrode in the same manner as in Example 1, and the resultant composite sheet was spirally wound to form an electrode assembly. Then, this electrode assembly and 3.00 ml of an alkaline electrolyte having a normality of 7.00 and comprising KOH and LiOH (molar ratio=17:1) were accommodated in the bottomed cylindrical vessel to manufacture a cylindrical nickel-hydrogen secondary battery of A size as shown in FIG. 1. The capacity (nominal capacity) "$C_0$" of the battery was 2.20 Ah.

When the chemical equivalent of alkaline electrolyte "X (meq/Ah)" per 1 Ah of battery capacity of the alkaline electrolyte accommodated in the vessel of the secondary battery was calculated from the aforementioned equation (I); $X=(Z_0 \times V)/C_0$ ($Z_0$=7.00N; V=3.00 ml; and $C_0$=2.20 Ah), X was found to be 9.55. This value of X was then introduced into the aforementioned equation (1): $\{0.409-(X/55)\} \leq Y \leq \{0.636+(2X/55)\}$ to obtain the following equation (h):

$$0.240 \leq Y \leq 0.983 \quad (h)$$

On the other hand, when the ion exchange capacity "Y" of the separator per 1 Ah of battery capacity was calculated from the aforementioned equation (II): $Y=(Y_0 \times W)/C_0$ ($Y_0$= 0.800 meq/g; W=0.743 g; and $C_0$=2.20 Ah), Y was found to be 0.270 meq/Ah.

EXAMPLE 44

A nickel-hydrogen secondary battery was manufactured by repeating the same procedures as employed in Example 43 except that the potassium ion exchange capacity $Y_0$ of the separator as measured by means of a titration method was 1.50 meq/g and the weight "W" of the separator was 0.733 g. When the ion exchange capacity "Y" of the separator per 1 Ah of battery capacity of the resultant secondary battery was calculated from the aforementioned equation (II), Y was found to be 0.500 meq/Ah.

EXAMPLE 45

A nickel-hydrogen secondary battery was manufactured by repeating the same procedures as employed in Example 43 except that the potassium ion exchange capacity $Y_0$ of the separator as measured by means of a titration method was 190 meq/g and the weight "W" of the separator was 0.753 g. When the ion exchange capacity "Y" of the separator per 1 Ah of battery capacity of the resultant secondary battery was calculated from the aforementioned equation (II), Y was found to be 0.650 meq/Ah.

EXAMPLE 46

A nickel-hydrogen secondary battery was manufactured by repeating the same procedures as employed in Example 43 except that the potassium ion exchange capacity $Y_0$ of the separator as measured by means of a titration method was 2.50 meq/g and the weight "W" of the separator was 0.730 g. When the ion exchange capacity "Y" of the separator per 1 Ah of battery capacity of the resultant secondary battery was calculated from the aforementioned equation (II), Y was found to be 0.830 meq/Ah.

Comparative Example 43

A nickel-hydrogen secondary battery was manufactured by repeating the same procedures as employed in Example 43 except that the potassium ion exchange capacity $Y_0$ of the separator as measured by means of a titration method was 0.200 meqlg and the weight "W" of the separator was 0.770 g. When the ion exchange capacity "Y" of the separator per 1 Ah of battery capacity of the resultant secondary battery was calculated from the aforementioned equation (II), Y was found to be 0.070 meq/Ah.

Comparative Example 44

A nickel-hydrogen secondary battery was manufactured by repeating the same procedures as employed in Example 43 except that the potassium ion exchange capacity $Y_0$ of the separator as measured by means of a titration method was 0.400 meq/g and the weight "W" of the separator was 0.770 g. When the ion exchange capacity "Y" of the separator per 1 Ah of battery capacity of the resultant secondary battery was calculated from the aforementioned equation (II), Y was found to be 0.140 meq/Ah.

Comparative Example 45

A nickel-hydrogen secondary battery was manufactured by repeating the same procedures as employed in Example 43 except that the potassium ion exchange capacity $Y_0$ of the separator as measured by means of a titration method was 3.10 meq/g and the weight "W" of the separator was 0.745 g. When the ion exchange capacity "Y" of the separator per 1 Ah of battery capacity of the resultant secondary battery was calculated from the aforementioned equation (II), Y was found to be 1.05 meq/Ah.

These secondary batteries obtained in Examples 43 to 46 and Comparative Examples 43 to 45 were subjected to the charging/discharging cycle test in the same manner as mentioned above to calculate the charge/discharge cycle life of the batteries. The results are shown in FIG. 6.

As seen from FIG. 6, the nickel-hydrogen secondary battery according to Examples 43 to 46 wherein the ion-exchange capacity Y (meq/Ah) of the separator per 1 Ah of battery capacity satisfied the aforementioned equation (1): $\{0.409-(X/55)\} \leq Y \leq \{0.636+(2X/55)\}$ indicated a longer charge/discharge cycle life as compared with the nickel-hydrogen secondary battery according to Comparative Examples 43 to 45 wherein the aforementioned ion-exchange capacity Y (meq/Ah) fell outside the range defined by the aforementioned equation (1).

It will be understood from Examples 39 to 46, it is possible to improve the charge/discharge cycle life of a nickel-hydrogen secondary battery, provided that the battery is provided with a separator satisfying the aforementioned equation (1) irrespective of the battery capacity and the size of the battery.

As explained above, it is possible according to this invention to provide a nickel-hydrogen secondary battery improved in charge/discharge cycle life.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A nickel-hydrogen secondary battery comprising;

a positive electrode containing nickel hydroxide;

a negative electrode containing a hydrogen-absorbing alloy;

a separator interposed between said positive electrode and said negative electrode and containing polyolefin based fibers having an ion-exchange group; and an alkaline electrolyte having a normality of 5 or more in concentration;

wherein said separator satisfies the following equation (1):

$$\{0.409-(X/55)\} \leq Y \leq \{0.636+(2X/55)\} \qquad (1)$$

where X is a chemical equivalent of alkaline electrolyte per 1 Ah of battery capacity (meq/Ah) and Y is an ion-exchange capacity of said separator per 1 Ah of battery capacity (meq/Ah).

2. The secondary battery according to claim 1, wherein said separator satisfies the following equation (2):

$$\{0.455-(X/55)\} \leq Y \leq \{0.545+(2X/55)\} \qquad (2).$$

3. The secondary battery according to claim 1, wherein said separator is formed of a sheet material containing polyolefin based fibers, at least part of said fibers having an ion-exchange group.

4. The secondary battery according to claim 3, wherein said fibers have an average fiber diameter ranging from 0.5 to 15 $\mu$m.

5. The secondary battery according to claim 1, wherein said polyolefin based fibers having an ion-exchange group is polyethylene fibers having an ion-exchange group and/or polypropylene fibers having an ion-exchange group.

6. The secondary battery according to claim 1, wherein said ion-exchange group is at least one kind of group selected from the group consisting of carboxyl group, sulfonic group and hydroxide group.

7. The secondary battery according to claim 1, wherein said ion-exchange group in said polyolefin based fibers is formed by a graft-polymerization of vinyl monomer having an ion-exchange group.

8. The secondary battery according to claim 7, wherein said vinyl monomer is acrylic acid monomer.

9. The secondary battery according to claim 1, wherein said electrolyte is an aqueous solution of at least one alkali component, and said electrolyte has a concentration not exceeding a concentration of an aqueous saturated solution of said at least one alkali component.

10. The secondary battery according to claim 1, wherein said chemical equivalent of alkaline electrolyte "X" (meq/Ah) is in the range of 5 to 24.

11. The secondary battery according to claim 1, wherein said alkaline electrolyte contains at least either lithium hydroxide or sodium hydroxide.

12. The secondary battery according to claim 11, wherein said alkaline electrolyte contains at least lithium hydroxide, and a concentration of lithium hydroxide in said alkaline electrolyte (N) is in the range of 0.1 to 1.5.

13. The secondary battery according to claim 11, wherein said alkaline electrolyte contains at least sodium hydroxide, and a concentration of sodium hydroxide in said alkaline electrolyte (N) is in the range of 0.5 to 6.0.

14. The secondary battery according to claim 1, wherein said hydrogen-absorbing alloy is represented by LmNi$_x$M-n$_y$A$_z$ (wherein A represents at least one element selected from Al and Co, and the total of atomic ratios of x, y and z meets the equation of $4.8 \leq x+y+z \leq 5.4$).

* * * * *